US012145801B2

(12) United States Patent
Austrheim

(10) Patent No.: US 12,145,801 B2
(45) Date of Patent: Nov. 19, 2024

(54) AUTOMATED STORAGE AND RETRIEVAL SYSTEM COMPRISING A STORAGE CONTAINER LIFT ASSEMBLY

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 967 days.

(21) Appl. No.: 17/051,036

(22) PCT Filed: May 29, 2019

(86) PCT No.: PCT/EP2019/064063
§ 371 (c)(1),
(2) Date: Oct. 27, 2020

(87) PCT Pub. No.: WO2019/229170
PCT Pub. Date: Dec. 5, 2019

(65) Prior Publication Data
US 2021/0229917 A1 Jul. 29, 2021

(30) Foreign Application Priority Data
May 31, 2018 (NO) .................................. 20180750

(51) Int. Cl.
*B65G 1/06* (2006.01)
*B65G 1/04* (2006.01)
(52) U.S. Cl.
CPC ........... *B65G 1/065* (2013.01); *B65G 1/0414* (2013.01); *B65G 1/0464* (2013.01); *B65G 1/0471* (2013.01); *B65G 1/0492* (2013.01)

(58) Field of Classification Search
CPC .... B65G 1/065; B65G 1/0414; B65G 1/0464; B65G 1/0471; B65G 1/0492; B65G 1/0485
See application file for complete search history.

(56) References Cited

U.S. PATENT DOCUMENTS 3,730,358 A * 5/1973 Oji ........................ B63B 25/004
  211/79
7,101,139 B1 * 9/2006 Benedict ................... B66B 9/00
  180/7.1

(Continued)

FOREIGN PATENT DOCUMENTS

EP    2920088 A1    9/2015
EP    3192753 A1    7/2017

(Continued)

OTHER PUBLICATIONS

International Search Report issued in PCT/EP2019/064063 mailed on Dec. 17, 2019 (8 pages).

(Continued)

*Primary Examiner* — Michael Collins
(74) *Attorney, Agent, or Firm* — Baker Botts L.L.P.

(57) ABSTRACT

An automated storage and retrieval system includes a track system including a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each grid cell including a grid opening defined by a pair of neighboring tracks of the first set of tracks and a pair of neighboring tracks of the second set of tracks; a plurality of storage columns each column being arranged to store a respective stack of storage containers; and a plurality of container handling vehicles for lifting and (Continued)

moving storage containers stacked in the stacks. The storage columns are located beneath the track system. Each storage column is located vertically below a grid opening. Each container handling vehicle is configured to move on the track system above the storage columns. The system further includes at least one transfer vehicle, arranged to transport at least one storage container in a horizontal plane which is located above the container handling vehicles, and at least one storage container lift assembly comprising at least one movable lifting member. Each movable lifting member is arranged to receive at least one storage container from the transfer vehicle, and the at least one movable lifting member is arranged for vertical movement to and from the plane where the transfer vehicle of the system operates.

18 Claims, 10 Drawing Sheets

(56) References Cited

U.S. PATENT DOCUMENTS

| | | | |
|---|---|---|---|
| 9,682,822 B2* | 6/2017 | Lindbo | B65G 1/0464 |
| 9,850,066 B2* | 12/2017 | Salichs | B65G 1/026 |
| 10,189,641 B2* | 1/2019 | Hognaland | B65G 1/06 |
| 11,072,494 B2* | 7/2021 | Hognaland | B65G 1/06 |
| 11,167,921 B2* | 11/2021 | Austrheim | B65G 1/0492 |
| 11,390,461 B2* | 7/2022 | Heggebø | B65G 1/065 |
| 11,453,552 B2* | 9/2022 | Lindbo | B65D 21/0209 |
| 11,498,757 B2* | 11/2022 | Austrheim | B65G 1/0485 |
| 11,827,448 B2* | 11/2023 | Hognaland | B65G 1/06 |
| 11,873,014 B2* | 1/2024 | Austrheim | B65G 1/0478 |
| 2005/0095106 A1* | 5/2005 | Pearce | B66F 9/122 414/627 |
| 2016/0013087 A1 | 1/2016 | Yoshioka | |
| 2016/0200516 A1* | 7/2016 | Baker | G06Q 10/08 414/807 |
| 2016/0272421 A1* | 9/2016 | Hognaland | B65G 1/06 |
| 2017/0129702 A1* | 5/2017 | Hognaland | B65G 1/0464 |
| 2018/0029798 A1 | 2/2018 | Lindbo et al. | |
| 2018/0065804 A1 | 3/2018 | Hognaland | |
| 2018/0086573 A1 | 3/2018 | Lindbo | |

FOREIGN PATENT DOCUMENTS

| | | |
|---|---|---|
| JP | H11-278607 A | 10/1999 |
| NO | 317366 B1 | 10/2004 |
| NO | 20170360 A1 | 9/2018 |
| WO | 98/58402 A1 | 12/1998 |
| WO | 2014/075937 A1 | 5/2014 |
| WO | 2014/090684 A1 | 6/2014 |
| WO | 2015/193278 A1 | 12/2015 |
| WO | 2016/198467 A1 | 12/2016 |
| WO | 2017/150005 A1 | 9/2017 |

OTHER PUBLICATIONS

Written Opinion of the International Searching Authority issued in PCT/EP2019/064063 mailed on Dec. 17, 2019 (22 pages).
Norwegian Search Report issued in No. 20180750 mailed on Dec. 27, 2018 (2 pages).

* cited by examiner

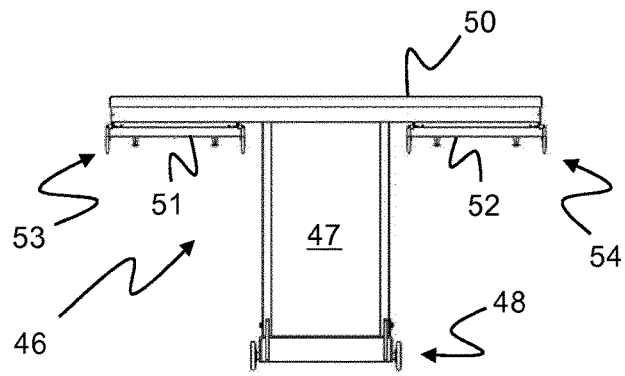
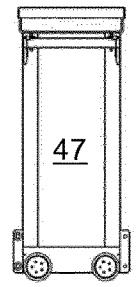
Fig. 7　　　　Fig. 8
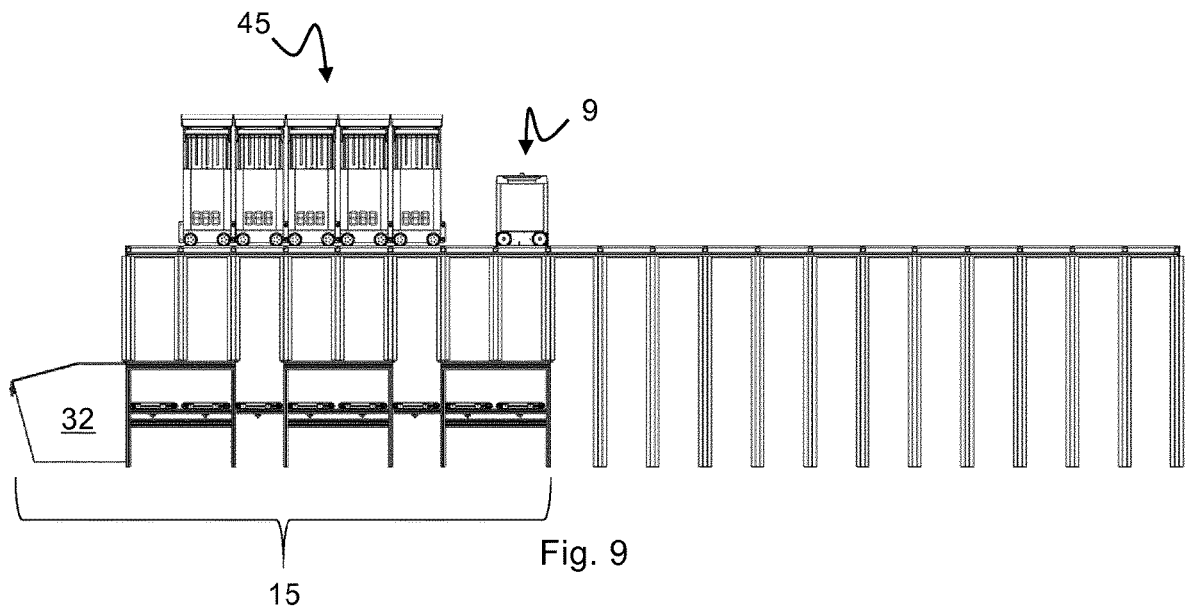
Fig. 9
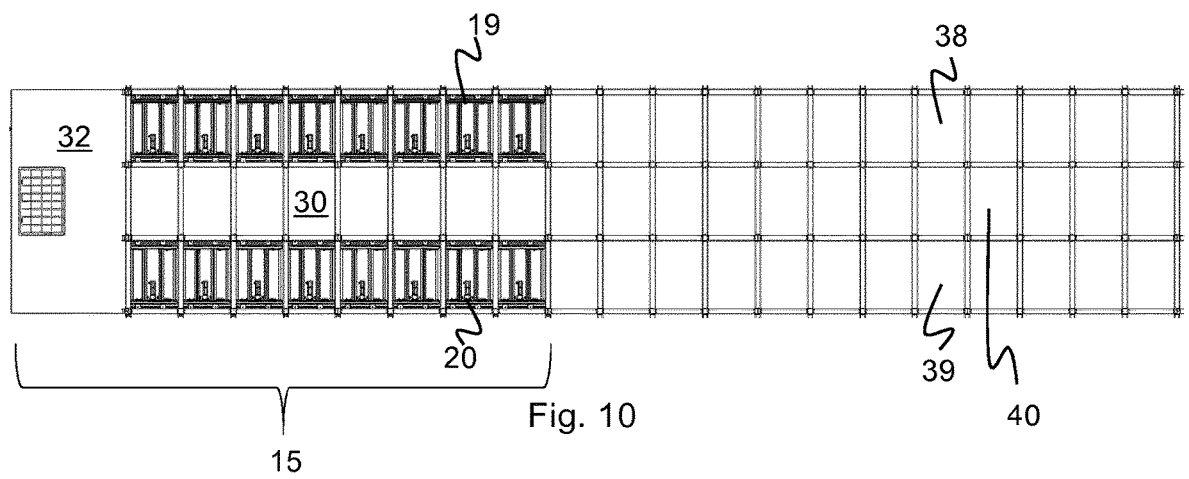
Fig. 10

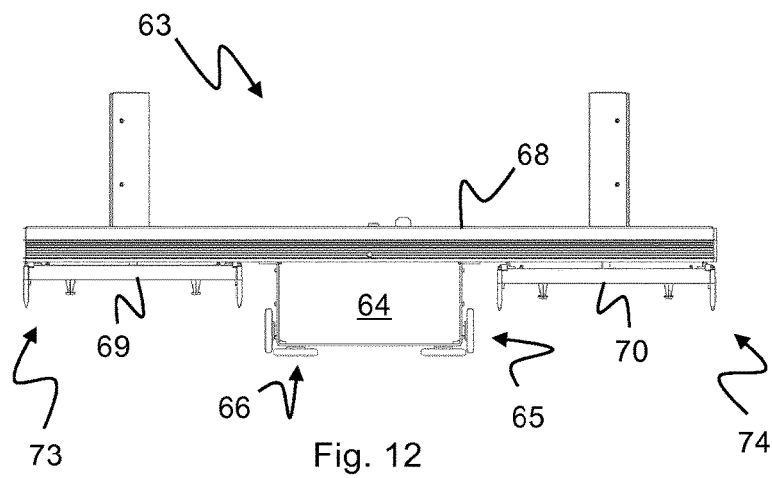
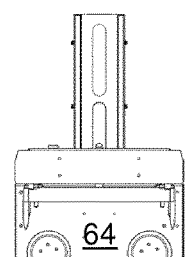
Fig. 12          Fig. 13
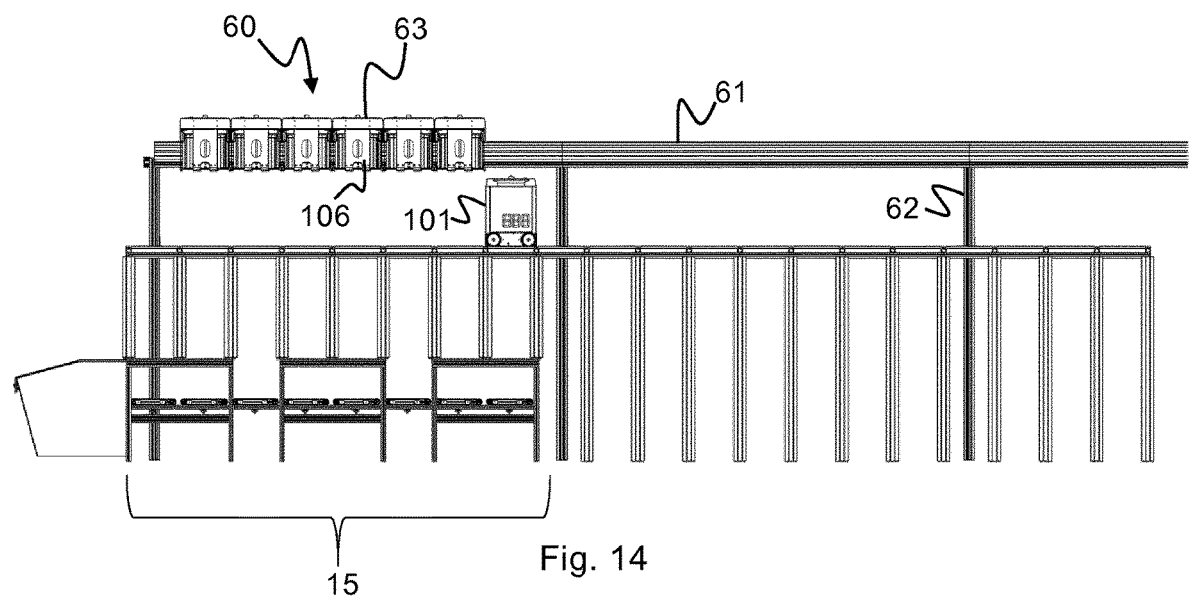
Fig. 14

AUTOMATED STORAGE AND RETRIEVAL SYSTEM COMPRISING A STORAGE CONTAINER LIFT ASSEMBLY

TECHNICAL FIELD

The present invention relates to an automated storage and retrieval system, a storage container lift assembly for vertical transport of a plurality of storage containers and a method thereof.

BACKGROUND AND PRIOR ART

FIG. 1 discloses a typical prior art automated storage and retrieval system 1 with a framework structure 100 and FIG. 2 discloses a prior art container handling vehicle 101 of such a system 1.

The framework structure 100 comprises a plurality of upright members 102 and a plurality of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. Each storage container 106 may typically hold a plurality of product items (not shown), and the product items within a storage container 106 may be identical, or may be of different product types depending on the application. The storage grid 104 guards against horizontal movement of the containers in the stacks 107, and guides vertical movement of the containers 106, but does normally not otherwise support the storage containers 106 when stacked.

The horizontal members 103 comprise a track system 108 arranged in a grid pattern across the top of the storage columns 105, on which track system 108 a plurality of container handling vehicles 101 are operated to raise storage containers 106 from and lower storage containers 106 into the storage columns 105, and also to transport the storage containers 106 above the storage columns 105. The track system 108 comprises a first set of parallel tracks 110 arranged to guide movement of the container handling vehicles 101 in a first direction X across the top of the frame structure 100, and a second set of parallel tracks 111 arranged perpendicular to the first set of tracks 110 to guide movement of the container handling vehicles 101 in a second direction Y, which is perpendicular to the first direction X. In this way, the track system 108 defines grid columns 112 above which the container handling vehicles 101 can move laterally above the storage columns 105, i.e. in a plane which is parallel to the horizontal X-Y plane.

Each container handling vehicle 101 comprises a vehicle body 101a, and first and second sets of wheels 101b, 101c which enable the lateral movement of the container handling vehicle 101 in the X direction and in the Y direction, respectively. In FIG. 2 two wheels in each set are visible. The first set of wheels 101b is arranged to engage with two adjacent tracks of the first set 110 of tracks, and the second set of wheels 101c is arranged to engage with two adjacent tracks of the second set 111 of tracks. Each set of wheels 101b, 101c can be lifted and lowered, so that the first set of wheels 101b and/or the second set of wheels 101c can be engaged with the respective set of tracks 110, 111 at any one time.

Each container handling vehicle 101 also comprises a lifting device (not shown) for vertical transportation of storage containers 106, e.g. raising a storage container 106 from and lowering a storage container 106 into a storage column 105. The lifting device comprises a gripping device (not shown) which is adapted to engage a storage container 106, and which gripping device can be lowered from the vehicle body 101a so that the position of the gripping device with respect to the vehicle body 101a can be adjusted in a third direction Z which is orthogonal the first direction X and the second direction Y.

Conventionally, and also for the purpose of this application, Z=1 identifies the uppermost layer of the grid 104, i.e. the layer immediately below the track system 108, Z=2 the second layer below the track system 108, Z=3 the third layer etc. In the exemplary prior art grid disclosed in FIG. 1, Z=8 identifies the lowermost, bottom layer of the grid 104. Similarly, X=1 identifies the first row of columns in the X direction from the corner chosen as the origin, and Y=1 identifies the first row of columns in the Y direction from the corner chosen as the origin.

Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 101 can be said to travel in layer Z=0 and each grid column 112 can be identified by its X and Y coordinates.

Each container handling vehicle 101 comprises a storage compartment or space for receiving and stowing a storage container 106 when transporting the storage container 106 across the track system 108. The storage space may comprise a cavity arranged centrally within the vehicle body 101a, e.g. as is described in WO2014/090684A1, the contents of which are incorporated herein by reference.

Alternatively, the container handling vehicles 101 may have a cantilever construction, as is described in NO317366, the contents of which are also incorporated herein by reference.

The container handling vehicles 101 may have a footprint (i.e. a footprint that covers an area with dimensions in the X and Y directions), which is generally equal to the area with dimensions in the X and Y directions defined by a grid column 12. i.e. an extension in the X and Y directions, which is generally equal to the lateral extension of a grid column 112, i.e. the extension of a grid column 112 in the X and Y directions, e.g. as is described in WO2015/193278A1, the contents of which are incorporated herein by reference. The term "lateral" used herein may mean "horizontal".

Alternatively, the container handling vehicles 101 may have a footprint which is larger than the lateral area defined by a grid column 112, e.g. as is disclosed in WO2014/090684A1.

The track system 108 may be a single rail system, as is shown in FIG. 3.

Alternatively, the track system 108 may be a double track system, as is shown in FIG. 4, thus allowing a container handling vehicle 101 having a footprint generally corresponding to the lateral area defined by a grid column 112 to travel along a row of grid columns even if another container handling vehicle 101 is positioned above a grid column neighboring that row. Both the single and double track system, and systems using a combination of single and double tracks, form a grid pattern in the horizontal plane P comprising a plurality of rectangular and uniform grid locations or grid cells 122, where each grid cell 122 comprises a grid opening 115 being delimited by a pair of tracks 110a, 110b of the first tracks 110 and a pair of tracks 111a, 111b of the second set of tracks 111. In FIG. 4 the grid cell 122 is indicated by a dashed box.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122.

In a storage grid 104, a majority of the grid columns 112 are storage columns 105, i.e. grid columns 105 where storage containers 106 are stored in stacks 107.

However, a grid 104 normally has at least one grid column 112 which is used not for storing storage containers 106, but which comprises a location where the container handling vehicles 101 can drop off and/or pick up storage containers 106 so that they can be transported to an access station 32 where the storage containers 106 can be accessed from outside of the grid 104 or transferred out of or into the grid 104. Within the art, such a location is normally referred to as a "port" and the grid column 112 in which the port is located may be referred to as a "port column" 19,20. Together, the port, port columns and access station are referred to as a "port module" 15 herein, as illustrated in FIGS. 6, 9, 10, 11, 14 and 18.

The grid 104 in FIG. 1 comprises two port columns 19 and 20. The first port column 19 may for example be a dedicated drop-off port column 19 where the container handling vehicles 101 can drop off storage containers to be transported to an access station 32, and the second port column 20 may be a dedicated pick-up port column 20 where the container handling vehicles 101 can pick up storage containers 106 that have been transported to the grid 104 from an access or a transfer station 32.

The access station 32 may typically be a picking or a stocking station where product items are removed from or positioned into the storage containers 106. In a picking or a stocking station 32, the storage containers 106 are normally never removed from the automated storage and retrieval system 1, but are returned into the grid 104 once accessed. A port can also serve as a transfer station 32 for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 19,20 and the access station 32.

The conveyor system may be arranged to transfer storage containers 106 between different grids, e.g. as is described in WO2014/075937A1, the contents of which are incorporated herein by reference.

WO2016/198467A1, the contents of which are incorporated herein by reference, discloses an example of a prior art access system having conveyor belts (FIGS. 5a and 5b) and a frame mounted track (FIGS. 6a and 6b) for transporting storage containers between ports and work stations where operators can access the storage containers.

When a storage container 106 stored in the grid 104 disclosed in FIG. 1 is to be accessed, one of the container handling vehicles 101 is instructed to retrieve the target storage container 106 from its position in the grid 104 and transport it to the drop-off port 19. This operation involves moving the container handling vehicle 101 to a grid location above the storage column 105 in which the target storage container 106 is positioned, retrieving the storage container 106 from the storage column 105 using the container handling vehicle's 101 lifting device (not shown), and transporting the storage container 106 to the drop-off port 19. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 19, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 101 is instructed to pick up the storage container 106 from the pick-up port 20 and transport it to a grid location above the storage column 105 where it is to be stored. After any storage containers positioned at or above the target position within the storage column stack 107 have been removed, the container handling vehicle 101 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104; the content of each storage container 106; and the movement of the container handling vehicles 101 so that a desired storage container 106 can be delivered to the desired location at the desired time without the container handling vehicles 101 colliding with each other, the automated storage and retrieval system 1 comprises a control system which typically is computerized and which typically comprises a database for keeping track of the storage containers 106.

A problem associated with known automated storage and retrieval systems 1 is that the area surrounding the ports 19,20 may become congested with container handling vehicles 101 instructed to drop off or pick up storage containers 106. This may seriously impede the operation of the automated storage and retrieval system 1. In small systems, this situation may possibly be alleviated by adding ports 19,20 to the grid 104, as this will allow the container handling vehicles 101 to be distributed among a larger number of ports 19,20 in order to avoid congestion. However, if ports 19,20 are added, conveyor system infrastructure must normally be increased to transport storage containers 106 away from the grid. This requires space, which may not necessarily be available. Also, adding conveyor system infrastructure is costly.

Furthermore, the current trend within the automated storage and retrieval system industry is that there is an increasing demand for larger storage grids 104. The need for a larger volume automated storage and retrieval system 1, may be solved by providing a larger sized storage grid 104 or by providing smaller separate storage systems 1. In order to achieve an efficient automated storage and retrieval system 1 with a capacity for handling the increased demand for large flow of storage containers 106 that passes through the system 1, the use of separate storage systems 1 invokes the problem of interaction between the storage systems 1 for flexible utilization and optimizing the available storage space.

In order to optimize available storage space within a prior art automated storage and retrieval systems, a bin lift for conveying storage containers 106 from grids 104 that are located at different vertical levels on top of each other to a delivery station is suggested in WO 2014/075937 A. This prior art bin lift is capable of carrying one storage container 106 at a time and is suitable for small sized storage systems, where the need for transferring storage containers 106 between the separate storage grid is not urgent. However, should an increased need for transfer of storage containers 106 be present, this will require organizing a larger number of available storage container vehicles 101 prepared for delivery of and receiving of the storage containers 106, with the additional unwanted effect of congestion problems.

In view of the above, it is desirable to provide an automated storage and retrieval system, and a method for operating such a system, that solve or at least mitigate one or more of the aforementioned problems related to use of prior art storage and retrieval systems.

SUMMARY OF THE INVENTION

The present invention is set forth and characterized in the main claims, and the dependent claims describe optional features of the invention.

The invention relates to an automated storage and retrieval system comprising:
- a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each grid cell comprising a grid opening defined by a pair of neighboring tracks of the first set of tracks and a pair of neighboring tracks of the second set of tracks;
- a plurality of storage columns each column being arranged to store a respective stack of storage containers wherein the storage columns are located beneath the track system, wherein each storage column is located vertically below a grid opening;

wherein the system further comprises:
- at least one transfer vehicle, arranged to transport at least one storage container in a horizontal plane which is located above the horizontal plane of the track system,
- at least one storage container lift assembly comprising at least one movable lifting member, wherein each movable lifting member is arranged to receive at least one storage container from the transfer vehicle, and the at least one movable lifting member is arranged for vertical movement to and from the plane where the transfer vehicle of the system operates.

In an aspect, the automated storage and retrieval system provides an increased capacity for the transfer of storage containers to an access station.

In preferential aspects, the system may comprise a plurality of container handling vehicles for lifting and moving storage containers stacked in the stacks, each container handling vehicle being configured to move on the track system above the storage columns.

The horizontal plane in which the at least one storage container is transported by the at least one transfer vehicle may preferably be arranged such that a lowermost part of the at least one storage container carried by the transfer vehicle is located vertically above the at least one movable lifting member.

In aspects, the storage and retrieval system may comprise at least one port module, such that the transfer vehicle can deposit and retrieve storage containers at the port module. The port module may comprise conveyors with positions for the deposit or retrieval of storage containers. In some aspects these positions may be arranged at the lower end of port columns and the conveyors may be arranged to transport storage containers between an access station and the retrieval and deposit positions. In aspects, the port module may be integrated into a grid, in other aspects the port module may be adjacent or on a similar vertical level with a transfer vehicle being arranged to move between the port module and the grid.

By the arrangement of the storage container lift assembly, storage containers may be efficiently transported between automated storage and retrieval systems or port modules that may be vertically displaced relative to each other, thereby expanding the transferring capacity of the storage system and allowing for the location of automated storage and retrieval systems and/or port modules at different vertical levels. The interaction between the at least one movable lifting member arranged for carrying a plurality of storage containers, and the transfer vehicle capable of transporting a plurality storage containers at a time, provides for an efficient utilization of the system as the transfer vehicle may be dedicated to moving storage containers of the track system.

In aspects of the invention, the transfer vehicle may comprise a vehicle body and a wheel assembly connected to the vehicle body. Each vehicle may further comprise a first set of container lifting and holding devices and a second set of container lifting and holding devices for retrieving from and storing a plurality of storage containers in the storage columns and for enabling the plurality of storage containers to be carried simultaneously.

In aspects of the invention, each container lifting and holding devices may be arranged for carrying a storage container. The number of storage containers to be carried by the set of container lifting and holding devices may vary. Even if the set of container lifting and holding devices preferably carries a plurality of storage containers, it may be possible that only one of the container lifting and holding devices within the set carries a storage container. At least one of the first set and second set of lifting and holding devices is arranged for enabling simultaneous lifting or lowering of a row of storage containers to and from the at least one lifting member designated for the row of storage containers.

The transfer vehicle may be arranged to travel to a transfer position in a storage container lift assembly, where storage containers are transferred between the transfer vehicle and the at least one movable lifting member.

In aspects of the invention, the first set of lifting and holding devices may be arranged at a first side of the vehicle body and the second set of lifting and holding devices may be arranged at a second side of the vehicle body.

In the transfer position, the at least one lifting member may receive storage containers from the transfer vehicle by the lowering of the container lifting and holding devices, or the lifting member is relieved of storage containers by the lifting of the container lifting and holding devices.

In aspects of the invention, the at least one storage container lift assembly comprises a plurality of movable lifting members.

One movable lifting member may be positioned below first set of container lifting and holding devices, and another movable lifting member may be positioned below a second set of container lifting and holding devices. After completing the transfer of storage containers between the transfer vehicle and the movable lifting members, the movable lifting members may move away from the transfer position in an upward or downward vertical direction.

In aspects, the movable lifting members are arranged independently movable in relation to each other. Thus, the movable lifting members may move in the same vertical direction, for example to another track system, or in different vertical directions, for example one movable lifting member moves upwards whilst the other moves downwards, or stays put. By this arrangement one movable lifting member may forward storage containers from one automated storage system to one vertical level, while another movable lifting member moves storage containers in an opposite direction to another vertical level. In aspects, the movable lifting members may move in the same direction, but at different speeds and to different vertical levels. Several movable lifting members, for instance two movable lifting members, may also be arranged as a pair transporting the storage containers more or less at the same time to and from an automated storage and retrieval system.

Suitable drive means such as a motorized hoisting mechanism for moving all the movable lifting members, or separate drive unit for each of the movable lifting members, is arranged to move the movable lifting members to and from an automated storage and retrieval system.

In aspects, the storage container lift assembly may comprise a first movable lifting member and a second movable lifting member. In aspects, the storage container lift assembly may comprise a third movable lifting member and a fourth movable lifting member. Arranging the storage container lift assembly with four movable lifting members may ensure that the ability of the storage container lift assembly to transfer storage containers meets the transfer vehicle's capacity of transporting storage containers. As some storage containers may need to be transferred to and from different vertical levels of the storage container lift assembly simultaneously.

In aspects of the invention the transfer vehicle may be configured to be operated on the track system or on a track in a horizontal plane which is located above the horizontal plane of the track system, and wherein an extension protrudes from the track system and into the storage container lift assembly, such that the transfer vehicle can be moved in to a position where a lowermost part of the at least one storage container transported by the transfer vehicle is located above at least one of the movable lifting members. In aspects, the extension may comprise a row protruding from the track system, such that a transfer vehicle arranged to travel on the track system can travel on the extension and in to a storage container lift assembly. In further aspects, the extension may comprise a rail or track arranged in a horizontal plane above the horizontal plane of the track system, on which a transfer vehicle is arranged to travel, and the extension protrudes from the rail or track above the track system and into a storage container lift assembly. The transfer vehicle may preferably be arranged to transport the storage containers in a plane located above the container handling vehicles, thereby minimizing the interference on the movement of the container handling vehicles.

In aspects of the invention, a first movable lifting member of the movable lifting members may be arranged on one side of the extension and a second movable lifting member of the movable lifting members may be arranged on the other side of the extension. Advantageously, the movable lifting members may thus be arranged with a horizontal distance such that the movable lifting members may pass the extension which protrudes into the storage container lift assembly. The lifting members are separated by a gap with horizontal spacing forming the horizontal distance, and the extension passes through said gap.

In aspects, the at least one movable lifting members may be connected to a guide structure of the storage container lift assembly, which guide structure enables vertical movement of the movable lifting member(s).

In aspects, the movable lifting members may be independently movable in relation to each other.

In aspects, the transfer vehicle may be operated on a monorail arranged above the track system. The monorail may comprise an extended monorail structure protruding from the track system, and may be arranged for positioning the transfer vehicle in a transfer position for transfer of the plurality storage containers to the at least one movable lifting member.

In aspects, the transfer vehicle may be operated on the track system. The track system may comprise an extended track system structure protruding from the remainder of the track system, which extended track system is arranged for positioning the transfer vehicle in a transfer position for transfer of the plurality storage containers to at least one movable lifting member.

In aspects, the transfer vehicle may comprise a plurality of vehicle sections which are connected one after the other in a train-like configuration, which vehicle sections each being configured to carry at least one storage container. This may allow the transfer vehicle to easily vary in size according to changing conditions in the storage system.

In aspects, the system may comprise at least one port module, such that the transfer vehicle may deposit and retrieve storage containers from said port module.

The invention furthermore relates to a storage arrangement comprising at least one automated storage and retrieval system according to any of the preceding claims, and at least one other automated storage and retrieval system comprising:
  a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each grid cell comprising a grid opening defined by a pair of neighboring tracks of the first set of tracks and a pair of neighboring tracks of the second set of tracks;
  a plurality of storage columns each column being arranged to store a respective stack of storage containers wherein the storage columns are located beneath the track system, wherein each storage column is located vertically below a grid opening;
  at least one transfer vehicle, arranged to transport at least one storage container in a horizontal plane which is located above the horizontal plane of the track system, where the at least two automated storage and retrieval systems are arranged vertically displaced in relation to each other, and at least one of the storage container lift assemblies extends at least between the different planes where the transfer vehicles of each system operate.

The storage container lift assembly may preferably thus be arranged to transport storage containers between the transfer vehicles operated over each track system.

In aspects, at least two of the automated storage and retrieval systems may comprise at least one additional storage container lift assembly extending between the different planes where the transfer vehicles of each system operate. Thus, for example, two storage container lift assemblies may extend between two storage and retrieval systems arranged at different vertical levels providing increased transport capacity between the two.

In aspects, the arrangement may comprise at least one port module arranged vertically displaced in relation to at least one of the automated storage and retrieval systems and at least one of the storage container lift assemblies may be arranged to transfer a plurality of storage containers between any of the automated storage and retrieval systems and at least one of the port modules.

The invention furthermore relates to least one automated storage and retrieval system according or the storage arrangement according to any of the aforementioned aspects, wherein the arrangement comprises at least one port module arranged vertically displaced in relation to each of the automated storage and retrieval systems, and wherein at least one of the storage container lift assemblies is arranged to transfer at least one storage container between each of the automated storage and retrieval systems and at least one of the port modules.

The invention furthermore relates to a storage container lift assembly for vertical transport of a plurality of storage containers, the storage container lift assembly comprising at least one movable lifting member, wherein each movable lifting member is arranged to receive a at least one storage container from a transfer vehicle operated on a track extending horizontally into the storage container lift assembly, and the at least one movable lifting member is arranged for vertical movement to and from at least one automated storage and retrieval system and/or port module.

The number of automated storage and retrieval systems may vary in accordance with volume and the constructional outlay of the system, and various configurations may be chosen according to need. Typically, the system will comprise, for example automated storage and retrieval systems. The storage container lift assembly may transfer storage containers to and from all or some of the automated storage and retrieval systems as selected among the plurality of automated storage and retrieval systems. If more than two automated storage and retrieval systems, the remaining automated storage and retrieval systems may be arranged reachable by other means for instance bridge structure for transporting the transfer vehicles between automated storage and retrieval systems.

Likewise, the number of port modules may also vary in accordance with volume and the constructional outlay of the system.

The invention furthermore relates to a method of operating an automated storage and retrieval system according to any of the aforementioned aspects, wherein the system further comprises plurality of container handling vehicles for lifting and moving storage containers stacked in the stacks, each container handling vehicle being configured to move on the track system above the storage columns, and wherein the method comprises the steps of:

arranging the at least one movable lifting member in a transfer position, moving the transfer vehicle into the storage container lift assembly, transferring at least one storage container between the transfer vehicle and the at least one movable lifting member.

In aspects of the invention, the method may comprise the steps of:

vertically transporting the at least one storage container using the at least one movable lifting member away from the transfer position.

In aspects of the invention, the method may comprise the steps of:

transporting the at least one storage container with the transfer vehicle to a port module.

In aspects of the invention, the method may comprise the steps of:

transporting the at least one storage container with the transfer vehicle to a port module.

In an aspect of the invention, the track system may comprise at least one transfer zone for temporarily storing storage containers when in transit between the plurality of storage columns and the storage container lift assembly or a port module, wherein the container handling vehicles are arranged to transport the storage containers between the storage columns and the at least one transfer zone.

The transfer zone is defined as a 2D area (in the Z and Y directions) on top of the rail system, i.e. the tracks, and the storage containers can be stored below the rail system or on top of the rail system from $Z=0$ to $Z=X$, where X is number of the lowermost storage position in the grid.

As compared to providing more ports to alleviate a congestion problem, it is easy to increase the number of transfer columns in the transfer zone in the rail system. Furthermore, the transfer columns in the transfer zone(s) can be located inside the track system, e.g. at a distance within the circumference of the track system, thus allowing the container handling vehicles access to the transfer columns from the X and Y directions. A port, on the other hand, is normally located at the circumference of the track system and, therefore, is normally only accessible from one direction. The transfer columns are preferably standard columns, and the location of the transfer zones with transfer columns in the track system can be computer operated, thereby the position of the transfer zone and thereby the transfer columns can be programmed to be at the most convenient location, and can be continuously changed. The transfer columns can be a row of 1, 2, 3, 4, 5,6, . . . , 10, . . . , 15 grid cells in the track system or more.

One transfer zone comprises a plurality of neighbouring individual transfer columns. The transfer columns can further be along more than one row, e.g. 2, 3 or more parallel rows, either neighbouring rows or not. The location of the transfer zone(s), i.e. the transfer columns, is thus preferably always temporarily. This renders possible freeing up area on the track system dependent on the operation of the container handling vehicles and or other vehicles moving on the rail system. For example, if a target storage container is below, i.e. for example at $Z=8$, and a temporarily transfer column is at $Z=6$, the transfer zone, and thereby the transfer column, can easily be relocated such that a container handling device can access the container at $Z=8$.

Furthermore, this temporarily location of the transfer zones, allows for flexibility and provides maximum storage capacity in the grid system.

It may be advantageous if the transfer columns form a transfer zone and a port module forms a port zone, wherein the transfer zone is adjacent the port zone. Alternatively, the transfer zone may be arranged at a distance from the port zone. In aspects of the invention, container handling vehicles may be utilised to transport the storage containers between the storage columns and the transfer columns in the transfer zone.

In aspects of the invention, the method may comprise the steps of:
  operating a control system to define at least one transfer zone in the track system for temporarily storing storage containers when in transit between the storage columns and the storage container lift assembly or a port module,
  utilizing container handling vehicles which are operated on the track system for retrieving storage containers from and storing storage containers in the transfer zone and for transporting the storage containers horizontally across the track system; and
  wherein the step of transporting the storage containers between the transfer zone and the storage container lift assembly or the port module comprises utilizing the transfer vehicle.

The invention furthermore relates to a method of operating an automated storage and retrieval system comprising the steps of:
  operating a control system to define at least one transfer zone in a track system for temporarily storing storage containers when in transit between storage columns and a storage container lift assembly,
  utilizing container handling vehicles which are operated on the track system for retrieving storage containers from and storing storage containers in the transfer zone and for transporting the storage containers horizontally across the track system; and
  wherein the step of transporting the storage containers between the transfer zone and the storage container lift assembly comprises utilizing a transfer vehicle,
  arranging at least one movable lifting member of the storage container lift assembly in a transfer position,
  moving the transfer vehicle into the storage container lift assembly,
  transferring at least one storage container between the transfer vehicle and the at least one movable lifting member,
  vertically moving the at least one movable lifting member out of the transfer position.

Furthermore, the invention relates to a method of operating a storage arrangement according to any of the aforementioned aspects, and where each automated storage and retrieval system is operated according to any of the aforementioned aspects.

In aspects, the method may further comprise the steps of:
  transporting least one storage container using the at least one movable lifting member between any of the automated storage and retrieval systems and any of the port modules.

The term "vertical" used herein may mean inclined (i.e. between the vertical and the horizontal), but it preferably means substantially purely vertical.

BRIEF DESCRIPTION OF THE DRAWINGS

Following drawings are appended to facilitate the understanding of the invention.

FIGS. 7 and 8 are orthogonal side views of a vehicle section of the transfer vehicle according to FIG. 6.

FIG. 9 is a side view of the transfer vehicle according to FIG. 6 over a port zone and port module.

FIG. 10 is a top view of the transfer vehicle according to FIG. 6 over a port zone and port module.

FIGS. 12 and 13 are orthogonal side views of a vehicle section of the transfer vehicle according to a similar aspect as in FIG. 11.

FIG. 14 is a side view of the transfer vehicle according to FIG. 11.

In the drawings, like reference numerals have been used to indicate like parts, elements or features unless otherwise explicitly stated or implicitly understood from the context.

DETAILED DESCRIPTION OF THE INVENTION

Figure 1:
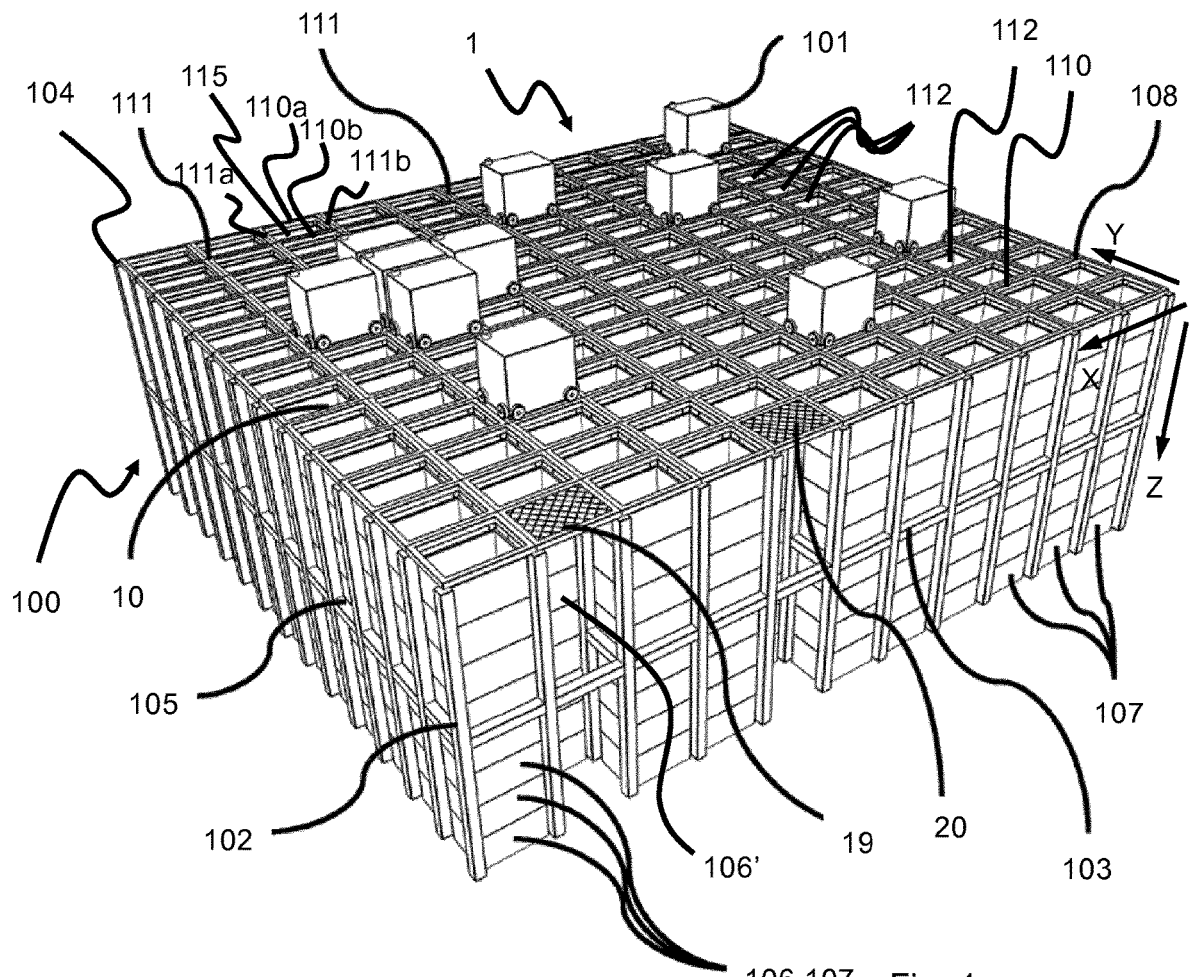
FIG. 1 is a perspective view of a grid of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 3:
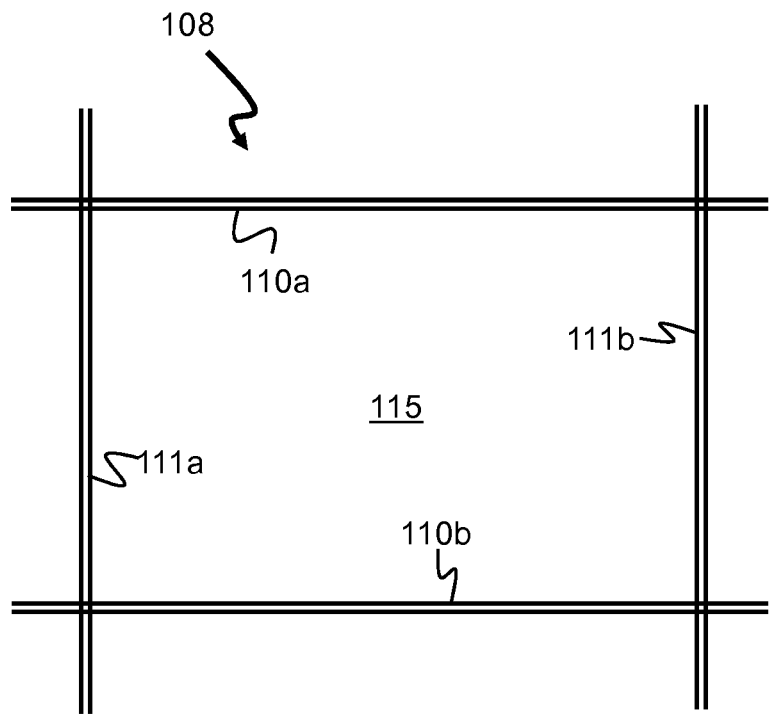
FIG. 3 is a top view of a prior art single rail grid.
Figure 4:
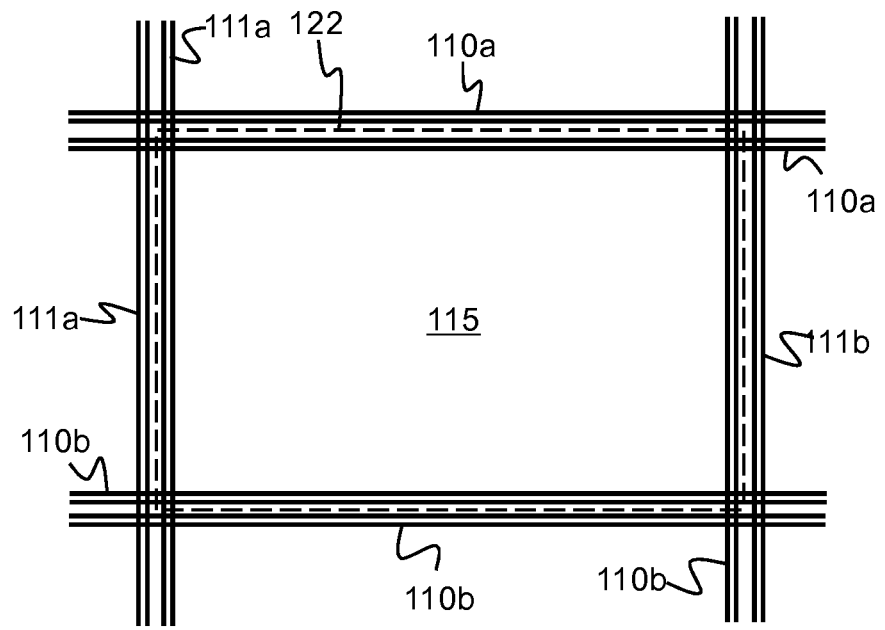
FIG. 4 is a top view of a prior art double rail grid.

If not otherwise stated herein, the framework 100 of the automated storage and retrieval system 1 is constructed in accordance with the prior art framework 100 described above in connection with FIGS. 1-4., i.e. a plurality of upright members 102 and a plurality of horizontal members 103 which are supported by the upright members 103, and further that the horizontal members 103 comprise the track system 108 of parallel tracks 110,111 in the X direction and the Y direction arranged across the top of storage columns 105/grid columns 112. The horizontal area of a grid column 112, i.e. along the X and Y directions, may be defined by the distance between adjacent rails 110 and 111, respectively (see also FIGS. 3 and 4).

Figure 2:
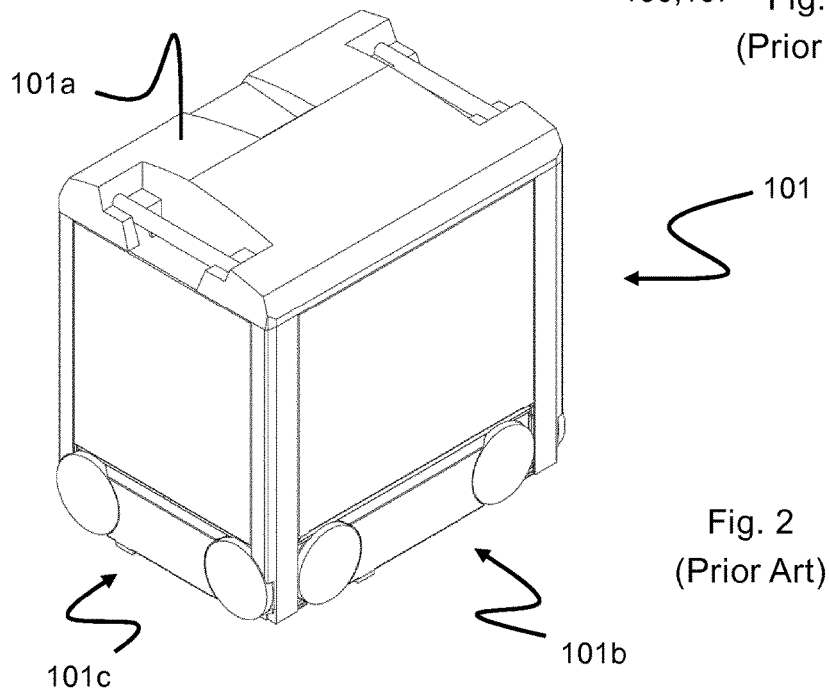
FIG. 2 is a perspective view of a prior art container handling vehicle.

Furthermore, the container handling vehicles 101 mentioned herein may be of any type known in the art, e.g. any one of the automated or robotic container handling vehicles discussed in relation to FIGS. 1 and 2. It may be advantageous, however, if each container handling vehicle 101 comprises a centrally located storage space for receiving and stowing a storage container 106 when transporting the storage container horizontally across the grid 104, and a footprint, which is generally equal to the lateral area defined by a grid column 112. This will allow a container handling vehicle 101 to transport a storage container above a row of grid columns even if another container handling vehicle 101 occupies a location above a grid column neighbouring the grid column row along which the container handling vehicle 101 is traveling.

Figure 5:
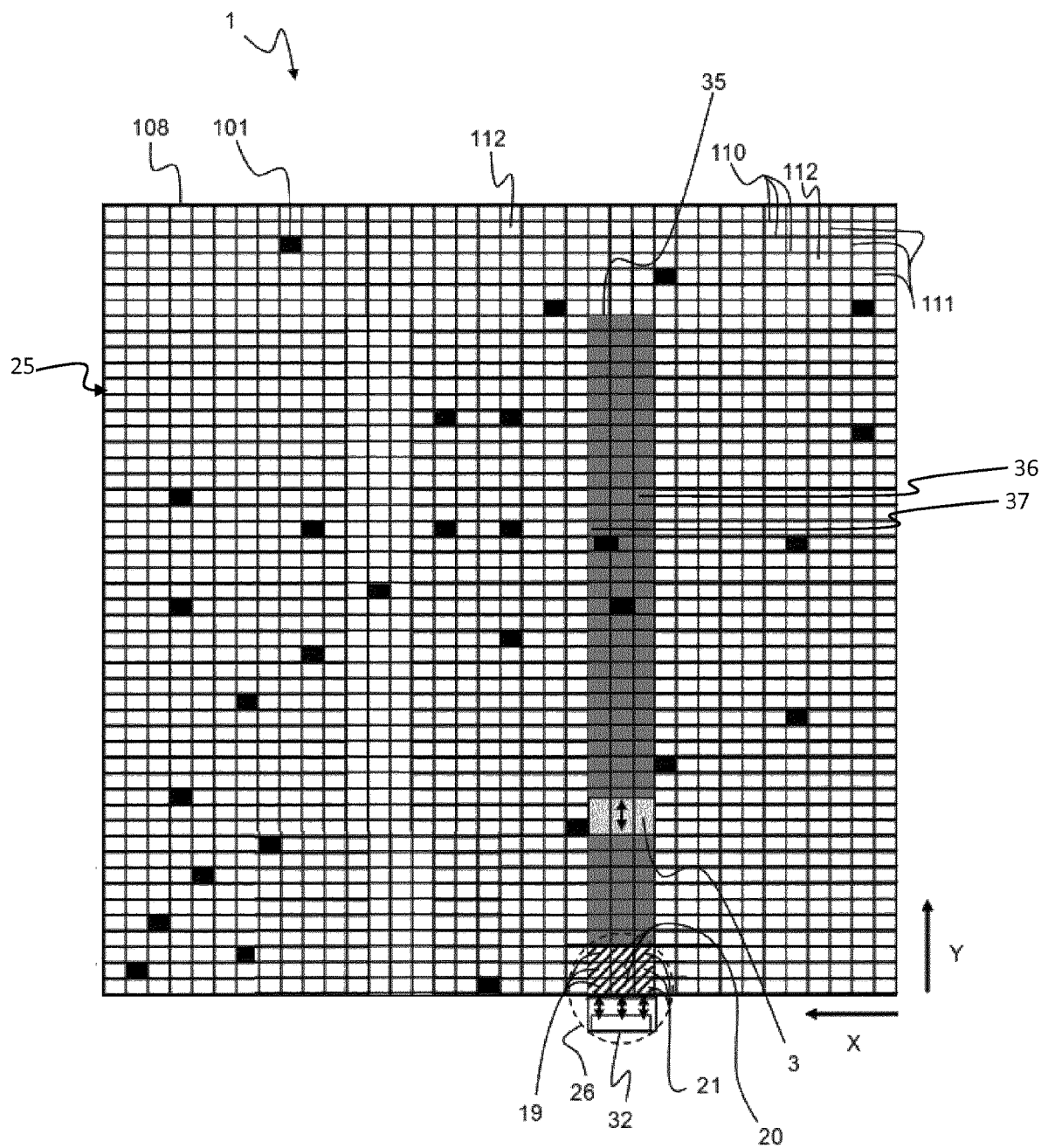
FIG. 5 is a top view of a track system with various transfer zone configurations.

An aspect of a storage structure of an automated storage and retrieval system 1 arranged to minimize congestion problems is shown in FIG. 5 in a top view. The storage grid 104 of each storage structure constitutes a framework 100 of in total 1800 (eighteen hundred) grid columns 112, where the width and length of the framework corresponds to the width and length of 36 (thirty six) and 50 (fifty) grid columns 112, respectively. The top layer of the framework 100 is a track system 108 onto which a plurality of container handling vehicles 101 and a transfer vehicle 3 are operated.

The black rectangles symbolize exemplary positions of container handling vehicles 101 intended to transport storage containers 106 to and from their respective grid columns 112 within the framework 100. While the light grey rectangles symbolize an exemplary position of a transfer vehicle 3 intended to transport the picked storage containers 106 between temporary storage positions within a transfer zone 35 of the framework 100 (dark grey area) and a port zone 26 containing one or more ports 19,20 (area framed by a dotted circle).

The port zone 26, which is exemplified as three grid cells wide in the X direction and seven grid cells long in the Y direction, comprises ports 19,20 where storage containers 101 can be transferred out of or into the grid 104. Correspondingly, the transfer zone 35 is also exemplified as three grid cells wide in the X direction, and forty three grid cells long in the Y direction and comprises transfer columns 36, 37. The storage zone 25 (indicated by the white area) makes up the rest of the grid 4, and comprises storage columns 105 in which storage containers or bins 106 can be stacked one on top of another to form stacks 107. The size and number of both transfer zones 35 and port zones 26 may vary according to need. While the size and position of the port zones 26 normally are fixed as they are dependent on the physical presence of ports, the size and position of the transfer zones 35 may be dynamic and set by the software controlling the storage container vehicles 101 and/or the port access vehicles 3. The grid 104 and transfer columns 36,37 in the transfer zone 35 are preferably identical in construction to the grid 104 and storage columns 105 in the storage zone 25, the only difference being that the transfer columns 36,37 are designated a special function as a transfer zone 35.

The use of transfer zones 35 illustrated in FIG. 5 reduces congestion around port zones 26 as the container handling vehicles 101 are operated on the grid 104, to transport storage containers 106 between the storage columns 105 and the transfer zones 35, where they are temporarily stored in the transfer columns 36,37. Meanwhile, the transfer vehicle 3 transports storage containers 101 between the transfer columns 36,37 and the port zone 26. The container handling vehicles 101 thus gain a larger area to deposit and retrieve storage containers 106, whilst multiple storage containers 106 are transferred between the port zone 26 and transfer zone 35 at a time by the transfer vehicle 3. As illustrated by the arrow on the transfer vehicle 3, it is typically restricted to travel in one direction only. The travelling direction of the transfer vehicle exemplified herein as the Y direction, though this depends on the layout of the grid 104 and transfer zone 35.

Transfer vehicles 3 are typically operated above the grid 104 for transferring storage containers 106 between the transfer zones 35 and the port zones 26, i.e. in a plane above the operating space of the container handling vehicles 101. Thus allowing the transfer vehicle 3 to carry a storage container 106 over a transfer column 36,37 even if a container handling vehicle 101 occupies the grid location above that drop-off or pick-up transfer column 36,37. Consequently, container handling vehicles 101 can be positioned over transfer columns 36,37 while the transfer vehicle simultaneously transports other storage containers 106 to and from the transfer zone 36, and to the port zone 26 above the container handling vehicles 101.

When a storage container 106 stored in one of storage columns 105 is to be accessed at the access station 32, a container handling vehicle 101 is instructed to retrieve the target storage container 106 from its position in the grid 104 and transport it to one of the drop-off transfer columns 36,37 i.e. to the transfer zone 35. This operation involves moving the container handling vehicle 101 to the grid location above the storage column 105 in which the target storage container 106 is positioned, retrieving the storage container 106 from the storage column 105 using the container handling vehicle's 101 lifting device, and transporting the storage container 106 to the intended transfer column 36. If the target storage container 106 is located deep within a stack, i.e. with one or a plurality of other storage containers 106 positioned above the target storage container 106, the operation also involves temporarily moving the above-positioned storage containers 106 prior to lifting the target storage container 106 from the storage column 105. This step may be performed with the same container handling vehicle 101 that is subsequently used for transporting the target storage container 106 to the transfer column 36 or, as is known in the art, with one or a plurality of other cooperating container handling vehicles 101. Alternatively, or in addition, as is also known in the art, the automated storage and retrieval system 1 may have container handling vehicles 101 specifically dedicated to the task of temporarily removing storage containers 106 from a storage column 105. Once the target storage container 106 has been removed from the storage column 105, the temporarily removed storage containers 106 can be repositioned into the original storage column 105 or, alternatively, relocated to other storage columns 105.

When the container handling vehicle 101 has positioned the target storage container 106 in the drop-off transfer column 36 and left the transfer zone 35, e.g. to retrieve another storage container 106, the transfer vehicle 3 is moved along the transfer zone 35, as indicated by the arrow in FIG. 5, and positioned above the drop-off transfer column 36,37 in which the container handling vehicle 101 has positioned the target storage container 106. The transfer vehicle 3 then retrieves the target storage container 106 from the drop-off transfer column 36,37 by lowering a gripping device, gripping the target storage container 106 and raising it to a carrying position, i.e. a position above the operating plane of the container handling vehicles 101.

The transfer vehicle 3 is then moved along the transfer zone 35 to the port zone 26, where the transfer vehicle 3 is positioned above a drop off port column 19. The target storage container 106 is then lowered into the drop off port column 19 and positioned on a conveyor, which transports the target storage container 106 to the access station 32.

Once accessed at the access station 32, the target storage container 106 is transferred back into the grid 104 to once again be stored in a storage column 105 in the storage zone 25. This operation is essentially the reversal of the above-discussed operation of fetching a storage container 106 from the grid 104.

In FIG. 5, the transfer vehicle 3 is exemplified as covering two cells in the Y direction and three cells in the X direction. However, many different variants of transfer vehicles 3,45, 60,75,80,81,82 may be used, as illustrated in the following with reference to FIGS. 6-10, 11-15, 16 and 17.

Figure 6:
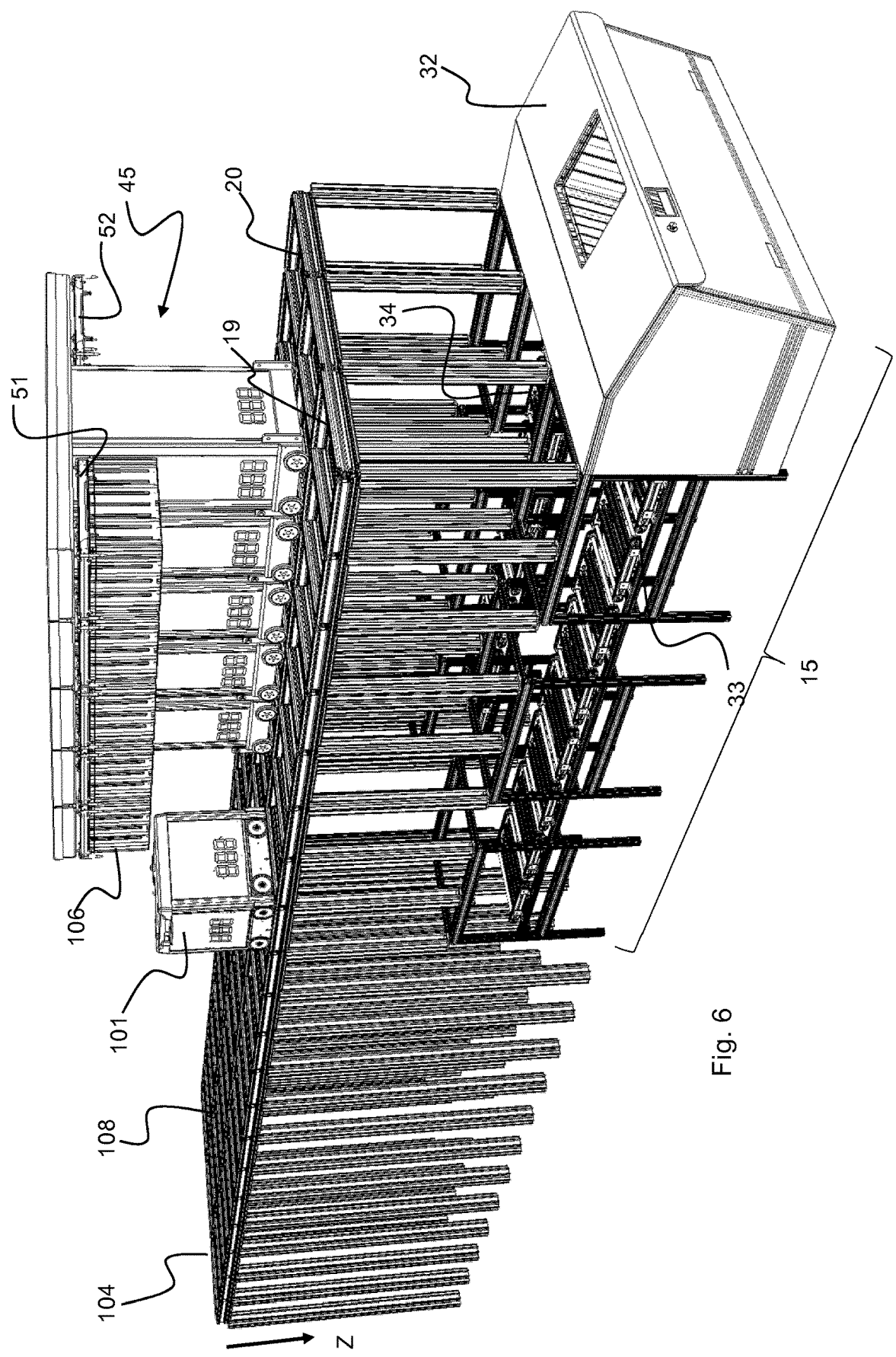
FIG. 6 is a perspective view of an aspect of a transfer vehicle according to the invention.

FIG. 6 illustrates a port zone 26, located above a port module 15 and an aspect of a transfer vehicle 45 in a perspective view. The track system 108 extends into the port zone 26, such that the transfer vehicle 45 and container handling vehicles 101 can access the area over the port columns 19,20. The port zone 26 comprises eight drop off ports 19 and eight pickup port columns 20 through which the storage containers 106 can be brought out of the grid 104. The transfer vehicle 45 is illustrated as occupying the area above five times three grid cells in the port zone 26. The transfer vehicle 45 comprises five vehicle sections 46 which are connected in a train-like configuration, i.e. one after the other. The transfer vehicle 45 is shown as carrying five storage containers 106 in a container gripping devices 51 above the drop off ports 19, whilst the container gripping devices 52 above the pickup ports 20 are empty.

A port module 15 is arranged for transporting storage containers 106 between the lower end of the ports 19,20 and an access station 32, which in the disclosed embodiment is a picking and stocking station. The port module 15 comprises a first conveyor 33 which is arranged underneath the drop off ports 19 to transport storage containers 106 from the drop off ports 19 to the access station 32, and a second conveyor 34 which is arranged underneath the pickup ports 20 to transport storage containers 106 from the access station 32 to the pickup ports 20.

FIG. 7 and FIG. 8 are side views of a vehicle section 46 of the transfer vehicle 45 according to the same aspect as shown in FIG. 6.

The vehicle section 46 comprises a horizontal bar or frame 50 which is mounted to the top of the vehicle body 47 and extends horizontally from both sides of the vehicle body 47 orthogonal to the dedicated direction of travel of the vehicle section 46, which dedicated direction of travel is defined by the set of wheels 48. On both sides of the vehicle body 47, the horizontal bar 50 supports a container lifting and holding device 53, 54. Each lifting and holding device 53, 54 comprises a container gripping device 51, 52, which can be lowered from the horizontal bar 50 to grip and hold a storage container. The gripping devices 51, 52 can be individually lowered in order to pick up and drop off storage containers independently of each other.

The lifting and holding devices 53, 54 are arranged to hold storage containers 106 in a raised, holding position when the transfer vehicle 45 transports storage containers 106. The vehicle body 47 of the vehicle sections 46 has a vertical extension which is sufficient to allow the lifting and holding devices 53, 54 to hold the storage containers 106 in a holding position which is above the operating space of the container handling vehicles 106, as shown in FIGS. 6 and 9.

As seen in FIGS. 6-9 each vehicle section 46 comprises a vehicle body 47 which has a footprint which generally corresponds to the lateral area defined by a grid column 12, thus allowing the transfer vehicle 45 to pass between container handling vehicles 101 which are dropping off or picking up storage containers 106. At the lower end of the vehicle body 47, a set of wheels 48 is mounted and configured to allow the vehicle section 46 to travel on the track system 108 in the Y direction. In the train of vehicle sections 46 making up the transfer vehicle 45, the set of wheels 48 of at least one of the vehicle sections 46 is motorized in order to propel the transfer vehicle 45.

FIG. 10 illustrates drop-off ports 19 and pick-up ports 20 in more detail. The drop-off ports 19 are arranged in a row 38, and the pick-up ports 20 are arranged in a row 39 parallel to row 38. An intermediate column row of grid columns 40 is positioned between rows 38 and 39. The transfer vehicle 45 operates along the row 40 of grid columns which extends into the grid from the port zone 26.

Due to the modular character of the transfer vehicle 45, the vehicle 45 can easily be adapted to different transfer zone 35 sizes and/or port configurations by adding or removing vehicle sections 46. Consequently, the transfer vehicle 45 can be configured to simultaneously transfer a plurality of storage containers 106. For example, when traveling from the transfer zone 35 to the port zone 26, gripping device 51 of all vehicle sections 46 can be employed to carry a storage container 106, e.g. as is disclosed in FIG. 9. Likewise, when traveling from the port zone 26 to the transfer zone 35, gripping device 52 of all vehicle sections 46 can be employed to carry a storage container 106.

FIGS. 11 to 15 disclose further aspects of a transfer vehicle 60 arranged to travel along an elevated rail structure 61, e.g. a monorail, which is supported by upright members 62. In the disclosed example, the rail structure 61 is arranged vertically above grid column row 40, i.e. it extends in the Y direction above the transfer zone 35.

Figure 11:
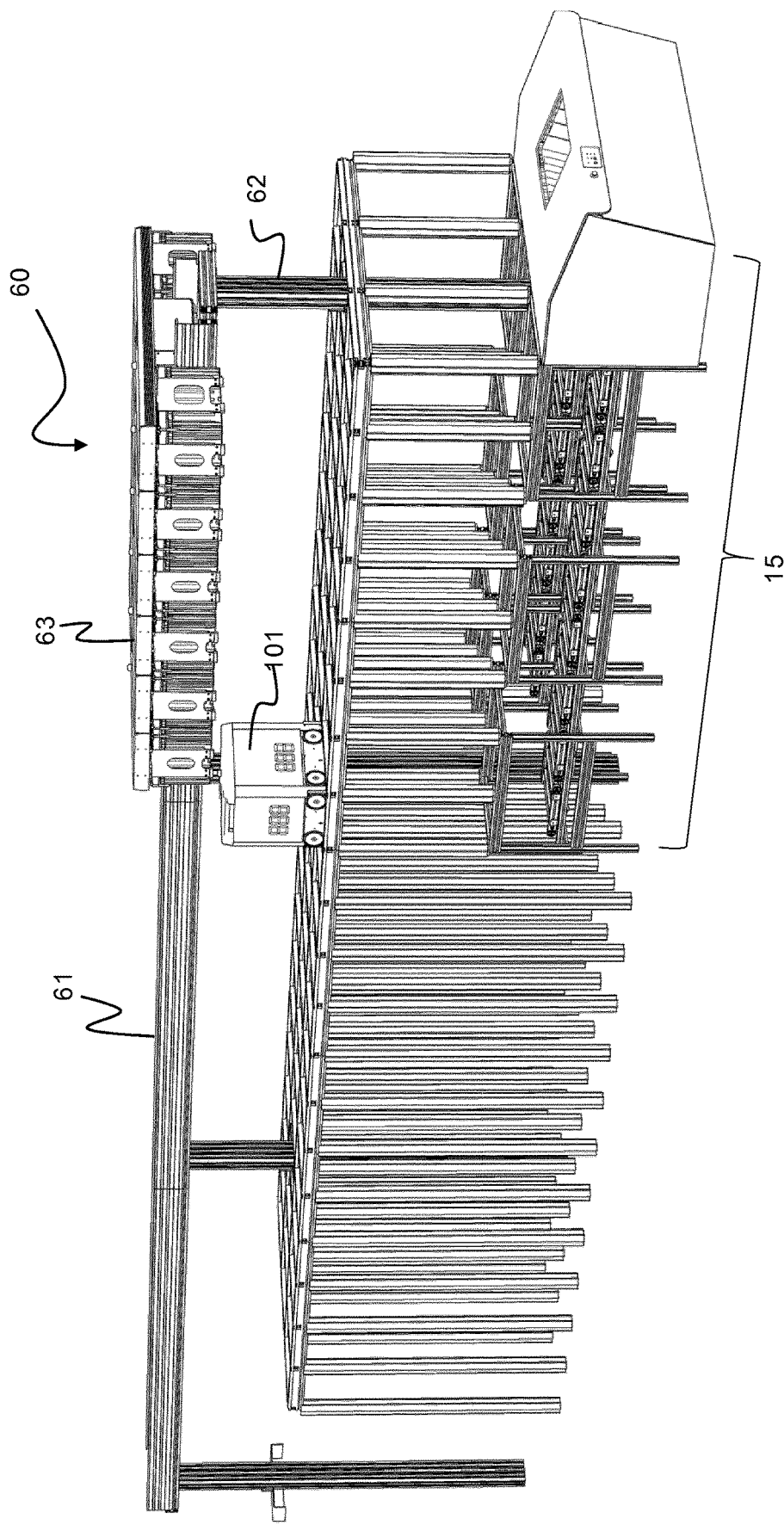
FIG. 11 is a perspective view of another aspect of a transfer vehicle according to the invention.
Figure 15:
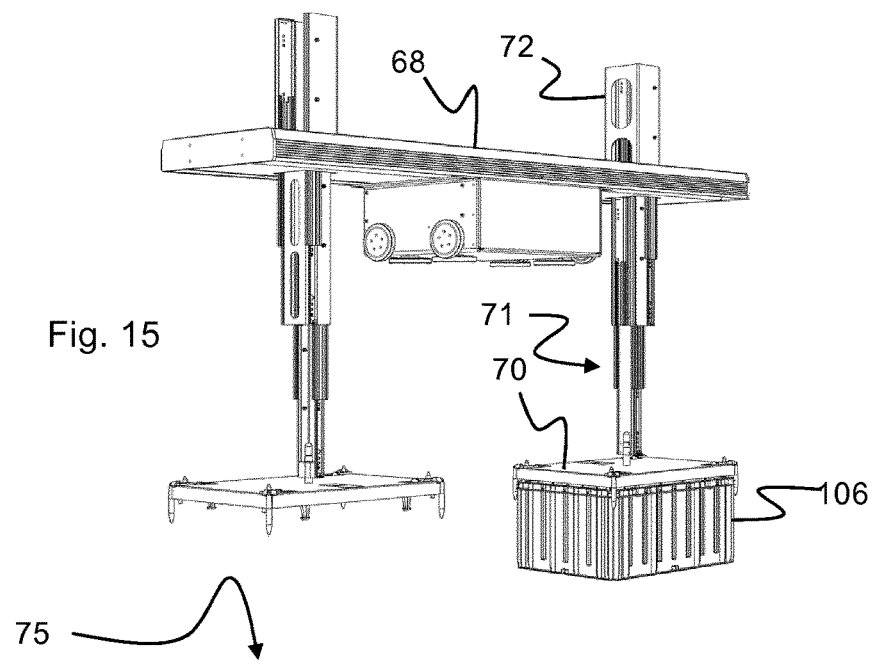
FIG. 15 is a perspective view of a vehicle section of the transfer vehicle according to the aspects of FIG. 12 and FIG. 13.

FIGS. 12, 13 and 15, illustrate an aspect of a transfer vehicle similar to the aspects in FIGS. 11 and 14. However, in FIGS. 12, 13 and 15 the lifting and holding devices 73, 74 each comprise a telescopic member 71 from which the gripping device 69, 70 is suspended. When retracted, the telescopic members 71 are protected by protective structures 72, which extend vertically from the horizontal bar 68.

The transfer vehicle 60 comprises a plurality of vehicle sections 63 which are connected in a train-like configuration, i.e. one after the other. Each vehicle section 63 comprises a vehicle body 64. At the lower end of the vehicle body 64, a first set of wheels 65 is mounted and configured to allow the vehicle section 63 to travel along the rail structure 61. A second set of wheel 66 is configured to prevent the vehicle section 63 from derailing and falling down from the rail structure 61.

In the train of vehicle sections 63 making up the transfer vehicle 60, the first set of wheels 65 and/or the second set of wheels 66 of at least one the vehicle sections 63 is motorized in order to propel the transfer vehicle 60 along the monorail 61.

The vehicle section 63 further comprises a horizontal bar or frame 68 which is mounted to the top of the vehicle body 64 and extends horizontally from both sides of the vehicle body 64 orthogonally to the dedicated direction of travel of the vehicle section 63. On both sides of the vehicle body 64, the horizontal bar 68 supports a storage container lifting and holding device 73, 74. Each lifting and holding device 73, 74 comprises a container gripping device 69, 70, which is arranged to be lowered from the horizontal bar 68 to grip and hold a storage container. The gripping devices 69, 70 can be individually lowered in order to pick up and drop off storage containers independently of each other.

The transfer vehicle 60 generally operates in the same way as the previously described transfer vehicle 45 with the difference that the transfer vehicle 60 operates along an elevated rail structure 61 instead of on the track system 108.

The rail structure 61 is mounted sufficiently high above the rail system 8 to allow storage containers 106 to be transferred in a plane located above the container handling vehicles 101, as illustrated in FIG. 14.

Figure 16:
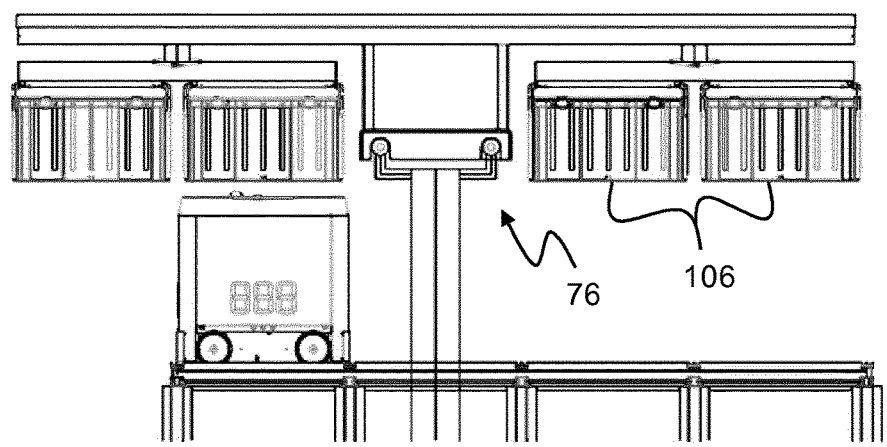
FIG. 16 is a side view of a yet another aspect of a transfer vehicle vehicle according to the invention.

FIG. 16 discloses a version of a transfer vehicle 75 operated on an elevated rail structure 76 where each gripping device 70 of the transfer vehicle 75 is capable of gripping and carrying two storage containers 106 simultaneously. This configuration requires that the transfer 35 and port zones 26 are (at least) five grid cells wide.

Figure 17:
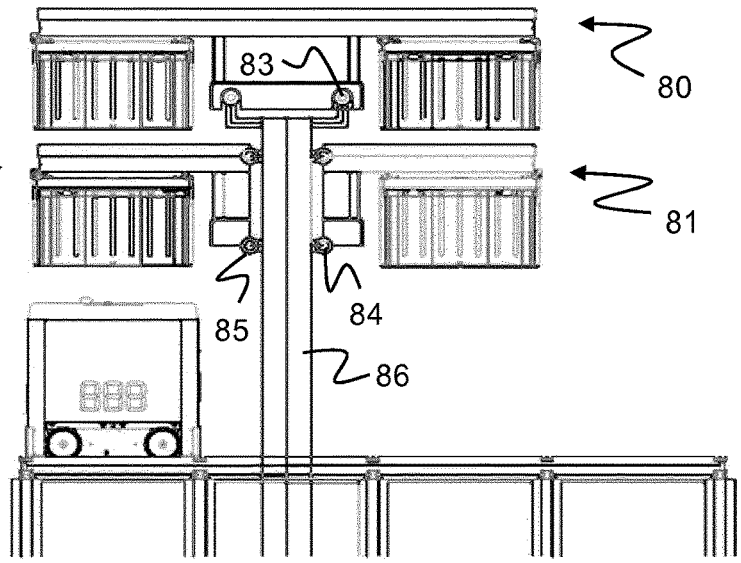
FIG. 17 is a side view of a further aspect of a transfer vehicle according to the invention.

FIG. 17 discloses yet another version of an elevated rail based system where three transfer vehicles 80, 81, 82 are arranged for the transfer of storage containers 106. The transfer vehicles 80, 81, 82 are operating independently of one another above the container handling vehicles 101, each transfer vehicle 80, 81, 82 having its own rail structure 83, 84, 85 along which it operates. The transfer vehicle 80 is similar to the transfer vehicle 60 of FIG. 12, which is arranged to operate in a vertical level above the transfer vehicles 81 and 82. The transfer vehicles 81 and 82 are independently operated on each side of the a common upright member 86, which supports the rail structures for the three transfer vehicles 80,81,82

Figure 18:
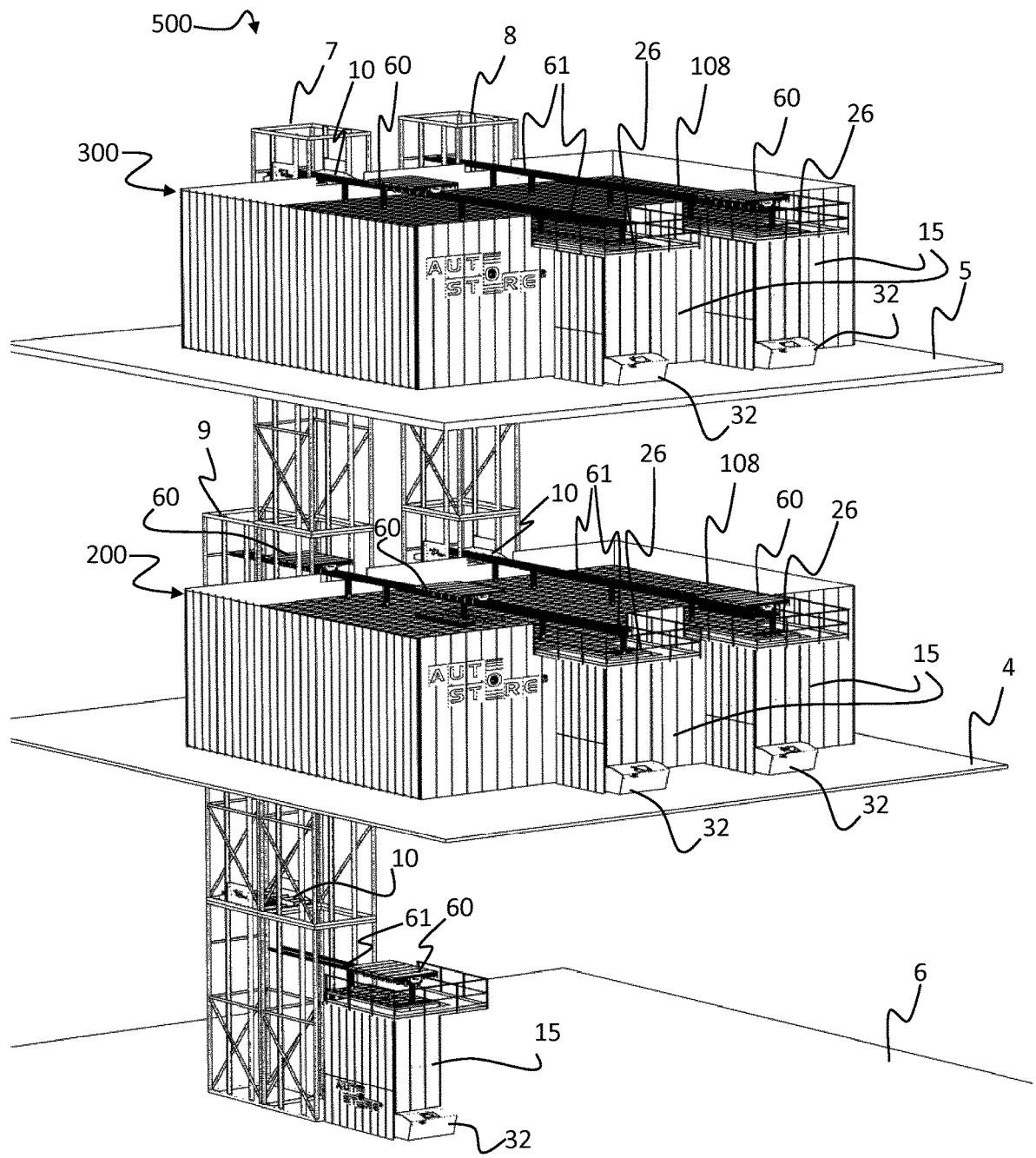
FIG. 18 shows, in perspective view, two automated storage and retrieval systems and a port module that are connected by storage container lift assemblies according to an embodiment of the invention.
Figure 19:
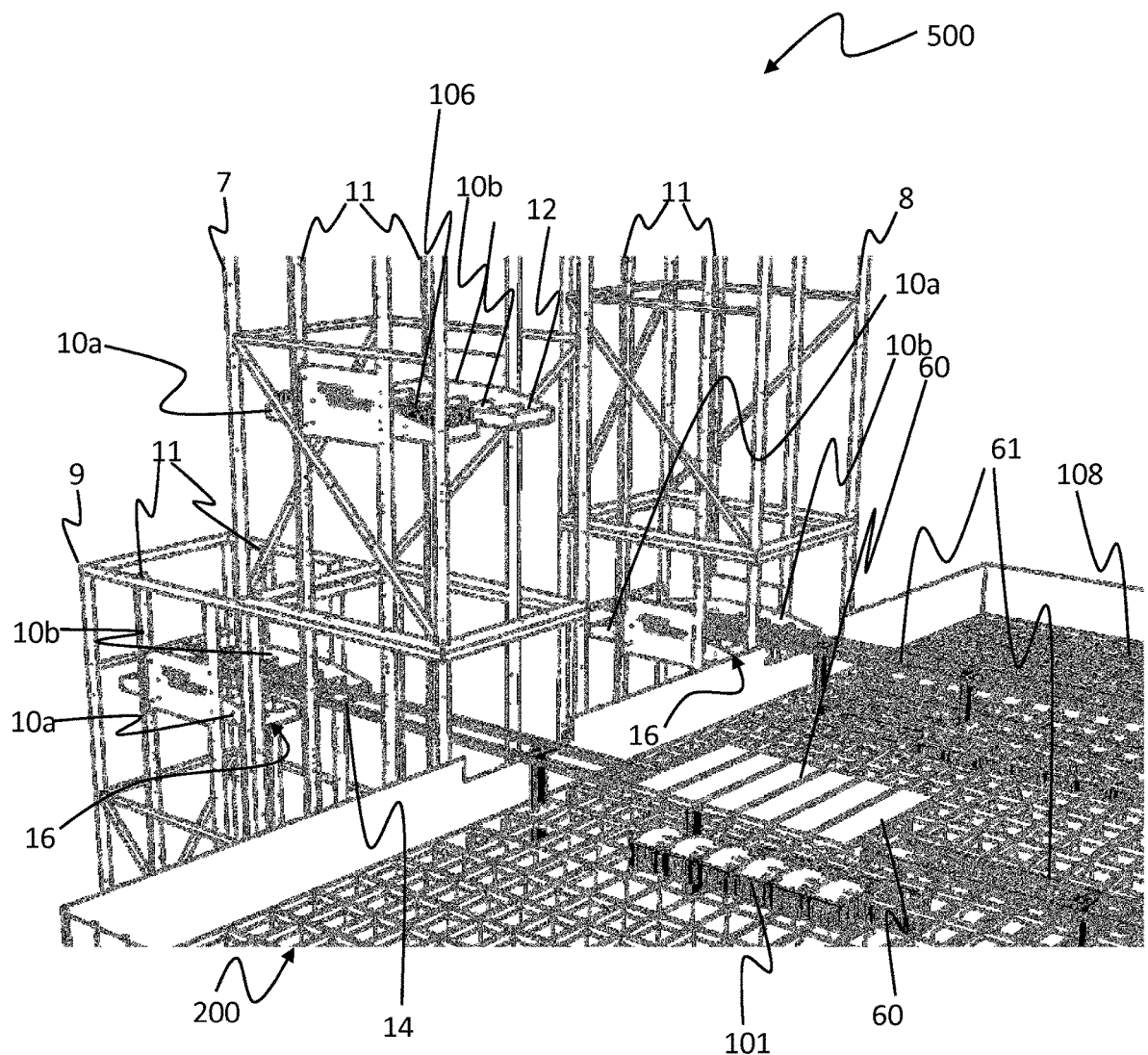
FIG. 19 is a perspective view showing more detail of the lower automated storage and retrieval system as shown in FIG. 18.

In the embodiment illustrated in FIGS. 18 and 19, a storage arrangement 500 is disclosed comprising two physically separated automated storage and retrieval systems 200,300. In contrast to the storage arrangement 500 shown in FIGS. 18 and 19, automated storage and retrieval systems 200,300 can be arranged at a horizontal distance to each other (not shown in the Figures). In this case, the rail based systems described with reference to FIGS. 11-17 may be used to transfer storage containers 106 between the automated storage and retrieval systems 200,300 in a mainly horizontal direction.

FIG. 18 shows an embodiment of the storage arrangement 500 comprising a first automated storage and retrieval system 200 and a second automated storage and retrieval system 300. The first automated storage and retrieval system 200 and the second automated and retrieval system 300 are arranged vertically displaced relative each other, e.g. the bottom of the upper storage and retrieval system 300 may be vertically above the top of the lower storage and retrieval system 200. Each of the automated storage and retrieval systems 200,300 is exemplified as having two port modules 15, and another port module 15 is also arranged at the ground floor 6. Thus, the flow of goods in the storage containers 106 in and out of the automated storage and retrieval systems 200,300 through the access stations 32 can be maximized. The first automated storage and retrieval system 200 and the second automated and retrieval system 300 are arranged at different vertical levels, where the first automated storage and retrieval system 200 is arranged on a first floor 4, and the second automated and retrieval system 300 is arranged on a second floor 5.

A first storage container lift assembly 7 is arranged to transport storage containers 106 between all the levels in the system, and is thus illustrated extending from the ground floor 6 where a port module 15 is arranged, to the first and second automated storage and retrieval systems 200,300. The port module 15 on the ground floor 6 comprises essentially the same components as the port module 15 in FIG. 11, although it is connected to the third storage container lift assembly 9. A second storage container lift assembly 8 is arranged solely between the first and second automated storage and retrieval systems 200,300, and yet another storage container lift assembly 9 is arranged between the port module 15 on the ground floor 6 and the first automated storage and retrieval system 200.

Each of the first and second automated storage and retrieval systems 200,300 is arranged with two elevated rail structures exemplified as the same rail structure 61 as in the aspects shown in FIGS. 11 and 14. The elevated rail structure 61 is illustrated as extending between a transfer zone 26 above a port module 15 and a container lift assembly 7,8,9 on an automated storage and retrieval system 200,300. An elevated rail structure 61 is also illustrated as extending between the container lift assemblies 9,7 and the port module 15 on the ground floor 6. Although not explicitly shown in the Figures, it will be apparent to the person skilled in the art, that any of the aforementioned aspects of transfer vehicles 3,45,60,75,80,81,82 and their track may also be used on the track systems 108 of the automated storage and retrieval systems 200,300 based on the disclosure of the invention herein. For instance, the transfer vehicle 45 according to the aspect in FIGS. 6-10 may be used, and would require at least one track extending into the container lift assembly 7,8,9, corresponding to an extension 14 of the row 40 illustrated in FIG. 10, so that the transfer vehicle 45 may drive into the storage container lift assembly 7,8,9 to deposit storage containers 106.

An extension 14 is illustrated in FIG. 19, where it is shown as an extension of the rail structure 61, protruding from the track system 108 and into the storage container lift assemblies 7,8,9. In aspects where the transfer vehicle 45 is used, the extension 14 illustrated in FIG. 19, would take the shape of a row 40 protruding from the track system 108.

In FIGS. 18 and 19 transfer vehicles 60 are shown as they move along the elevated rail structure 61 to pick up and deliver storage containers 106 to and from storage columns 105 under the track system 108. The elevated rail structure 61 extends over the track system 108 into a port zone 26 for bringing the storage containers 106 or receiving the storage containers 106 from a port module 15. As such, the transfer vehicles 60 and storage columns 105 in a track system 108 work according to the aspect described with reference to FIG. 5, with transfer zones 35 being arranged beneath the elevated rail structure 61 for access by the transfer vehicle 60.

FIG. 19 illustrates the first automated storage and retrieval system 200 and the two storage container lift assemblies 7,8 in further detail. As shown, the rail structure 61 allows the transfer vehicle 60 to enter into the container lift assemblies 7,8,9, where storage containers 106 are retrieved and deposited from movable lifting members 10a, 10b.

Each movable lifting member 10a, 10b is arranged for carrying a plurality of storage containers 106 between the automated storage and retrieval systems 200,300 and to and from the ground level port module 15. Each storage container lift assembly 7,8,9 is illustrated as having a first movable lifting member 10a and a second movable lifting member 10b.

The movable lifting members 10a, 10b are exemplified with a tray comprising projecting side walls positioned to define compartments 12, for carrying the plural storage containers 106 in a row. Each compartment 12 is arranged for receiving a storage container. As seen in the first container lift assembly 7, the first movable lifting member 10a has been stocked with storage container, whilst the second storage container 10b is empty. The number of storage containers 106 to be received by the compartments is restricted by the number of compartments 12 as configured in the tray. Although not illustrated herein, the trays may be arranged with a plurality of rows for receiving containers 106. Typically such a configuration is suited for use in combination with an aspect of a transfer device as illustrated in FIG. 16.

As illustrated in FIGS. 18 and 19, each movable lifting member 10a, 10b extends no further than beyond the rail structure 61 in the container lift assembly 7,8,9, where there is a gap between the members 10a, 10b, such that each member 10a, 10b may pass the rail structure 61 as it moves in the container lift assembly 7,8,9. For aspects where a transfer vehicle 45 operates on a track as in FIG. 6, the lifting members 10a, 10b will extend no further than that they may pass on each side of the track extending into the container lift assembly 7,8,9.

Each movable lifting member 10a, 10b is connected to a guide structure 11 for guiding the lifting member 10a, 10b in a vertical direction in the container lift assembly 7,8,9. The movable lifting members 10a, 10b may be arranged with guide means, for instance wheels, to facilitate moving the movable lifting members 10a, 10b along the guide structures 11. In other aspects, the guide structures 11 may comprise pulleys to facilitate movement of the lifting members 10a, 10b. Each of the movable lifting members 10a, 10b may be arranged to move independently of the other movable lifting members 10a, 10b, although they are illustrated as being on the same vertical level relative each other in the Figures.

The movable lifting members 10a, 10b are illustrated in container lift assemblies 7,8,9 in various positions. In FIG. 18 the movable lifting members 10a, 10b of the first and second container lift assemblies 7,8 are illustrated in a transfer position 16 where the transfer vehicle 60 may retrieve or deposit storage containers 106 from their compartments, on the first and second automated storage and retrieval systems 200,300 respectively. The movable lifting members 10a, 10b of the third container lift assembly 9 is illustrated in an intermediate position in FIG. 18, where it is travelling between the first automated storage and retrieval system 200 and the port module 15 on the ground floor. In FIG. 19, the movable lifting members 10a, 10b of the second and third container lift assemblies 8,9 are shown as empty, and in a transfer position 16 where they are ready to receive storage containers 106 from the transfer vehicles 60 on the first automated storage and retrieval system 200. The movable lifting members 10a, 10b of the first container lift assembly 7 are shown in FIG. 19 in an intermediate position travelling between the first automated storage and retrieval systems 200 and the second automated storage and retrieval systems 300.

The transfer vehicle 60 in FIG. 19 is illustrated as it is retrieving or depositing storage containers 106 to columns in a transfer zone 35 arranged in the track system 108. As previously described, the transfer vehicle 60 transfers storage containers 106 between a port zone 26 of a track system 108 and the transfer columns of a transfer zone 35. Similarly, the transfer vehicle 60 transfers storage containers 106 between the transfer zone 36 and the container lift assemblies 7,8,9 as will be described in the following.

In FIG. 19, the transfer vehicle 60 may for example be retrieving a plurality of storage containers 106 from storage columns 105, typically in a transfer zone 35, which are to be deposited on the movable lifting members 10a, 10b located in a transfer position 16 in the third container lift assembly 9. The transfer vehicle 60 thus lifts storage containers 106 from the columns, until they are brought up to the horizontal bar 50. The transfer vehicle 60 moves along the elevated rail structure 61, through the first container lift assembly 7 and into the third container lift assembly 9, whereupon the storage containers 106 are deposited on the movable lifting members 10a, 10b.

After the storage containers 106 have been deposited onto the movable lifting members 10a, 10b, the transfer vehicle 60 moves back through the first container lift assembly 7 and to a position above the track system 108 for picking up a new batch of storage containers 106. The movable lifting members 10a, 10b may move vertically either to the port module 15 on the ground floor 6 or to the second automated storage and retrieval system 300, or they may move independently in opposite directions, or one lifting member 10a, 10b may remain put. Once the movable lifting members 10a, 10b have arrived at their new destination, for example a transfer position 16 by the relay port 15 on the ground floor level 6, a transfer vehicle 60 will move over the movable lifting members 10a, 10b. The transfer vehicle 60 retrieves the storage containers 106 in the movable lifting members 10a,10b, and transports the storage containers 106 to be dropped off at the access station 32, or in the transfer zone 35 of the second automated storage and retrieval system 300 should that be the case.

The abovementioned operation is one example of many operations which the invention makes possible, and the reverse operation and many other variants will be apparent to the person skilled in the art based on the disclosure of the invention herein. For example the transfer vehicle 3,45,60, 75,80,81,82 may also transport storage containers 106 directly between movable lifting members 10a, 10b and a port zone 26 of a track system 108.

In some situations, one of the movable lifting members 10a may depart for delivering a row of storage containers 106 to the second automated storage and retrieval system 300, while the other movable lifting member 10b having already received a row of storage containers 106, may prepare for receiving another row of storage containers 106 on top of the first row by moving the movable lifting member 10b downward to a lower position allowing space for delivery of an additional row on the movable lifting member by the transfer vehicle 3,45,60,75,80,81,82.

As mentioned previously, the transfer vehicle 3,45,60,75, 80,81,82 may interact with one or both movable lifting members 10a, 10b at the same time. The transfer vehicle 3,45,60,75,80,81,82 may lift or lower storage containers 106 to and from both movable lifting members 10a, 10b more or less simultaneously. In some situations the first lifting and holding devices 53 arranged at one side of the transfer vehicle 3,45,60,75,80,81,82 may be designated for dropping off storage containers 106, while the second lifting and holding devices 54 arranged at the other side of the transfer vehicle 3,45,60,75,80,81,82, and in the transfer position 16 one of the lifting and holding devices 53, 54 may be depositing storage containers 106 to one of the movable lifting members 10a, 10b, while the other of the lifting and holding devices 53, 54 may be relieving storage containers 106 from the movable lifting members 10a, 10b.

For monitoring and controlling the automated storage and retrieval systems 200,300, the container lift assemblies 7,8,9 and the storage arrangement 500 so that a desired storage container 106 can be delivered to the desired location at the desired time without the vehicles 101,3,45,60,75,80,81,82 or lifting members 10a, 10b colliding with each other, a control system (not shown) is provided, which typically is computerized and comprises a database for monitoring and controlling e.g. the location of the respective storage containers 106 within the storage grids 104, the content of each storage container 106 and the movement of the vehicles 101 3,45, 60,75,80,81,82 and lifting members 10a, 10b.

The vehicles 101, 3, 45, 60, 75, 80, 81, 82 typically communicate with the control system via wireless communication means, e.g. via a WLAN operating under an IEEE 802.11 (WiFi) standard and/or via a mobile telecommunication technology such as 4G or higher.

In the preceding description, various aspects of an automated storage and retrieval system, a storage arrangement and a storage container lift assembly according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

| Reference numerals: | |
|---|---|
| 1 | Storage and retrieval system |
| 3 | Transfer vehicle |
| 4 | First floor |
| 5 | Second floor |
| 6 | Ground floor |
| 7 | First storage container lift assembly |
| 8 | Second storage container lift assembly |
| 9 | Third storage container lift assembly |
| 10 | Movable lifting members |
| 10a | First movable lifting member |
| 10b | Second movable lifting member |
| 11 | Guide structure |
| 12 | Compartment |
| 13 | |
| 14 | Extended track |
| 15 | Port module |
| 16 | Transfer position |
| 18 | |
| 19 | Port column, drop-off port |
| 20 | Port column, pick-up port |
| 21 | Port column |
| 22 | Lifting plate |
| 25 | Grid storage zone |
| 26 | Port zone |
| 30 | Grid column |
| 31 | |
| 32 | Access station, picking and stocking station |
| 33 | First conveyor |
| 34 | Second conveyor |
| 35 | Transfer zone |
| 36 | Transfer column |
| 37 | Transfer column |
| 38 | Row of columns |
| 39 | Row of columns |
| 40 | Intermediate column row |
| 45 | Transfer Vehicle |
| 46 | Vehicle Section |
| 47 | Vehicle body |
| 48 | Set of Wheels |
| 50 | Horizontal bar or frame |
| 51 | Container gripping device |
| 52 | Container gripping device |
| 53 | Lifting and holding device |
| 54 | Lifting and holding device |
| 60 | Transfer vehicle |
| 61 | Rail structure |
| 62 | Upright members |
| 63 | Vehicle section |
| 64 | Vehicle body |
| 65 | Set of wheels |
| 68 | Horizontal bar |
| 69 | A container gripping device |
| 70 | A container gripping device |
| 71 | A telescopic member |
| 72 | Protective structures |
| 73 | Lifting and holding device |
| 74 | Lifting and holding device |
| 76 | Rail structure |
| 80 | Transfer vehicle |
| 81 | Transfer vehicle |
| 82 | Transfer vehicle |
| 83 | Rail structure |
| 84 | Rail structure |
| 85 | Rail structure |

-continued

| Reference numerals: | |
|---|---|
| 100 | Framework structure |
| 101 | Storage container vehicle |
| 101a | Vehicle body of the storage container vehicle 101 |
| 101b | Drive means in first direction (X) |
| 101c | Drive means in second direction (Y) |
| 102 | Upright members of framework structure |
| 103 | Horizontal members of framework structure |
| 104 | Storage grid/three dimensional grid |
| 105 | Storage column |
| 106 | Storage container |
| 106' | Particular position of storage container |
| 107 | Stack |
| 108 | Rail system/track system |
| 110 | Parallel tracks in first direction (X) |
| 110a | First set of tracks |
| 110b | Second set of tracks |
| 111 | Parallel tracks in second direction (Y) |
| 111a | First set of tracks |
| 111b | Second set of tracks |
| 112 | Grid column |
| 115 | Grid opening |
| 122 | Grid cell |
| X | First direction |
| Y | Second direction |
| P | Horizontal plane |
| 200 | First storage and retrieval system |
| 300 | Second storage and retrieval system |
| 500 | Storage arrangement |

The invention claimed is:

1. An automated storage and retrieval system comprising:
a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each grid cell comprising a grid opening defined by a pair of neighboring tracks of the first set of tracks and a pair of neighboring tracks of the second set of tracks;
a plurality of storage columns each column being arranged to store a respective stack of storage containers, wherein the storage columns are located beneath the track system, wherein each storage column is located vertically below a grid opening;
a plurality of container handling vehicles for lifting and moving storage containers stacked in the stacks, each container handling vehicle being configured to operate on the track system above the storage columns;
at least one transfer vehicle, arranged to:
extract, from a stack, at least one storage container that has been stored in the stack through operation of one of the container handling vehicles; and
transport the extracted at least one storage container in a horizontal plane which is located above the container handling vehicle,
at least one storage container lift assembly comprising at least one movable lifting member, wherein each movable lifting member is arranged to receive at least one storage container from the transfer vehicle, and the at least one movable lifting member is arranged for vertical movement to and from the plane where the transfer vehicle of the system operates.

2. The system according to claim 1, wherein the at least one storage container lift assembly comprises a plurality of movable lifting members.

3. The system according to claim 1, wherein the transfer vehicle is configured to be operated on the track system or on a track in a horizontal plane which is located above the horizontal plane of the track system, and wherein an extension protrudes from the track system and into the storage container lift assembly, such that the transfer vehicle can be moved in to a position where a lowermost part of the at least one storage container transported by the transfer vehicle is located above at least one of the movable lifting members.

4. The system according to claim 3, wherein a first movable lifting member of the movable lifting members is arranged on one side of the extension and a second movable lifting member of the movable lifting members is arranged on another side of the extension.

5. The system according to claim 1, wherein the at least one movable lifting member is connected to a guide structure of the storage container lift assembly, which guide structure enables vertical movement of the at least one movable lifting member.

6. The system according to claim 2, wherein the movable lifting members are independently movable in relation to each other.

7. The system according to claim 1, wherein the system comprises at least one port module, such that the transfer vehicle can deposit and retrieve storage containers at the at least one port module.

8. A storage arrangement comprising at least one automated storage and retrieval system according to claim 1, and at least one other automated storage and retrieval system comprising:
   a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each grid cell comprising a grid opening defined by a pair of neighboring tracks of the first set of tracks and a pair of neighboring tracks of the second set of tracks;
   a plurality of storage columns each column being arranged to store a respective stack of storage containers, wherein the storage columns are located beneath the track system, wherein each storage column is located vertically below a grid opening;
   at least one transfer vehicle, arranged to transport at least one storage container in a horizontal plane which is located above the container handling vehicle,
   wherein the at least two automated storage and retrieval systems are arranged vertically displaced in relation to each other, and at least one of the storage container lift assemblies extends at least between different planes where the transfer vehicle of each system operate.

9. The storage arrangement according to claim 8, wherein at least two of the automated storage and retrieval systems comprise at least one additional storage container lift assembly extending between the different planes where the transfer vehicle of each system operate.

10. A storage arrangement comprising at least one automated storage and retrieval systems according to claim 1, wherein the arrangement comprises at least one port module arranged vertically displaced in relation to each of the automated storage and retrieval systems, and wherein at least one of the storage container lift assemblies is arranged to transfer at least one storage container between each of the automated storage and retrieval systems and at least one of the port modules.

11. The automated storage and retrieval system of claim 1, wherein the at least one transfer vehicle comprises:
   a first lifting device configured to raise and lower a first storage container of the storage containers, and
   a second lifting device configured to raise and lower a second storage container of the storage containers.

12. A storage container lift assembly for vertical transport of a plurality of storage containers, the storage container lift assembly comprising at least one movable lifting member,
   wherein each movable lifting member is arranged to receive at least one storage container from a transfer vehicle operated on a track extending horizontally into the storage container lift assembly and
   the at least one transfer vehicle is arranged to:
   extract, from a stack of storage containers, at least one storage container that has been stored in the stack through operation of a container handling vehicle; and
   transport the extracted at least one storage container in a horizontal plane which is located above the container handling vehicle, and
   wherein the at least one movable lifting member is arranged for vertical movement to and from at least one automated storage and retrieval system and/or a port module.

13. A method of operating an automated storage and retrieval system according to claim 1, wherein the method comprises:
   arranging the at least one movable lifting member in a transfer position,
   moving the transfer vehicle into the storage container lift assembly,
   transferring at least one storage container between the transfer vehicle and the at least one movable lifting member.

14. The method according to claim 13, further comprising:
   vertically transporting the at least one storage container using the at least one movable lifting member away from the transfer position.

15. The method according to claim 13, further comprising:
   transporting the at least one storage container with the transfer vehicle to a port module.

16. The method according to claim 13, further comprising:
   operating a control system to define at least one transfer zone in the track system for temporarily storing storage containers when in transit between the storage columns and the storage container lift assembly or a port module,
   utilizing container handling vehicle which are operated on the track system for retrieving storage containers from and storing storage containers in the transfer zone and for transporting the storage containers horizontally across the track system; and
   transporting the storage containers between the transfer zone and the storage container lift assembly or the port module using the transfer vehicle.

17. A method of operating a storage arrangement according to claim 8, wherein each system is operated according to a method comprising:
   arranging the at least one movable lifting member in a transfer position, moving the transfer vehicle into the storage container lift assembly, transferring at least one storage container between the transfer vehicle and the at least one movable lifting member.

18. The method according to claim 17, further comprising:

transporting the at least one storage container using the at least one movable lifting member between any of the automated storage and retrieval systems and any of port modules.

* * * * *